(12) United States Patent
Lussier et al.

(10) Patent No.: US 11,155,076 B2
(45) Date of Patent: Oct. 26, 2021

(54) METHOD FOR INKJET PRINTING

(71) Applicant: Eastman Kodak Company, Rochester, NY (US)

(72) Inventors: Barbara Boland Lussier, Rochester, NY (US); Allan Francis Sowinski, Rochester, NY (US); Mark Edward Irving, Rochester, NY (US); David D. Putnam, Fairport, NY (US); Todd Russell Griffin, Webster, NY (US); Douglas Eugene Bugner, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 73 days.

(21) Appl. No.: 16/551,890

(22) Filed: Aug. 27, 2019

(65) Prior Publication Data
US 2021/0062023 A1   Mar. 4, 2021

(51) Int. Cl.
*C09D 11/322* (2014.01)
*B41J 2/005* (2006.01)
(Continued)

(52) U.S. Cl.
CPC ............ *B41J 2/01* (2013.01); *B41J 2/0057* (2013.01); *B41J 2/2107* (2013.01); *B41J 2/2114* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 29/02; B41J 2/17513;
(Continued)

(56) References Cited

U.S. PATENT DOCUMENTS

| 8,173,215 B2 | 5/2012 | Sowinski et al. |
| 8,455,570 B2 | 6/2013 | Lindstrom et al. |

(Continued)

FOREIGN PATENT DOCUMENTS

| JP | 2001353962 A | 12/2001 |
| WO | 2010/098818 | 9/2010 |

*Primary Examiner* — Manish S Shah
(74) *Attorney, Agent, or Firm* — J. Lanny Tucker

(57) ABSTRACT

Inkjet printing is carried out to provide monochrome or polychrome inkjet-printed images. An ink-receptive medium is provided with a substrate with an aqueous-based ink-receptive layer disposed thereon. The aqueous-based ink-receptive layer has: (a) one or more water-soluble salts of a multivalent metal cation in an amount of 0.6-49 weight %; (b) one or both of a polyvinyl alcohol and a polyvinyl amine (or a copolymer of a vinyl alcohol and vinyl amine) in a total amount of 0.5-30 weight %; and optionally, (c) a crosslinking agent and (d) silica particles. One or more aqueous pigment-based inks are inkjet printed onto this aqueous-based ink-receptive layer, each ink comprising: a) one or more anionically-stabilized pigment colorants; b) one or more water-miscible humectants that are present in a total amount of 1-20 weight % and each having a carbon atom to oxygen atom ratio of at least 1.0:1.0 and only two hydroxy groups.

19 Claims, 3 Drawing Sheets

(51) Int. Cl.
*B41J 2/21* (2006.01)
*B41J 2/01* (2006.01)

(58) Field of Classification Search
CPC .... B41J 2/17509; B41J 29/13; B41J 2/17553;
B41J 2/1606; B41J 2/1642; B41J 2/1609;
B41J 2/164; B41J 2/162; B41J 2/161;
B41J 2/19; B41J 15/04; B41J 25/001;
B41J 25/34; B41J 25/003; B41J 25/312;
B41J 2025/008; B41J 2202/21; B41J
2/17596; B41J 2/16508; B41J 2/1652;
B41J 2/16538; B41J 2/175; B41J
2/17563; C09D 11/36; C09D 11/40;
C09D 11/30; C09D 11/38; C09D 11/32;
C09D 11/322; C09D 11/324; C09D
11/328; C09D 11/101; C09D 11/102;
C09D 11/005; C09D 11/54; C09D 11/52;
C09D 11/106; C09D 11/326; C09D
11/107; C09D 11/03; C09D 11/037;
C09D 11/033; B41M 5/0011; B41M
7/0072; B41M 5/52; B41M 5/5218;
B41M 5/5227
See application file for complete search history.

(56) References Cited

U.S. PATENT DOCUMENTS

| | | | |
|---|---|---|---|
| 8,562,126 B1 | 10/2013 | Xiang et al. | |
| 8,991,986 B2 | 3/2015 | Sowinski et al. | |
| 9,010,909 B2 | 4/2015 | Nelson et al. | |
| 9,067,448 B2 | 6/2015 | Dannhauser et al. | |
| 9,376,582 B1 | 6/2016 | Dannhauser et al. | |
| 9,434,201 B2 | 9/2016 | Dannhauser et al. | |
| 9,573,349 B1 | 2/2017 | Dannhauser et al. | |
| 9,828,513 B2 | 11/2017 | Lussier et al. | |
| 9,828,514 B2 | 11/2017 | Lussier et al. | |
| 2003/0203134 A1 | 10/2003 | Sheng | |
| 2007/0043144 A1 | 2/2007 | House et al. | |
| 2009/0123675 A1* | 5/2009 | Shaw-Klein | B41M 5/52 428/32.25 |
| 2009/0169761 A1 | 7/2009 | Szajewski et al. | |
| 2009/0169762 A1* | 7/2009 | Szajewski | C09D 11/322 427/466 |
| 2009/0195579 A1* | 8/2009 | Tousi | B41M 5/00 347/14 |
| 2010/0221460 A1* | 9/2010 | Wexler | B41M 5/5218 428/32.1 |
| 2011/0279554 A1 | 11/2011 | Dannhauser et al. | |
| 2013/0278689 A1* | 10/2013 | Sowinski | C09D 11/322 347/90 |
| 2017/0145232 A1 | 5/2017 | Bauer et al. | |
| 2017/0292032 A1 | 10/2017 | Lussier et al. | |
| 2018/0051184 A1 | 2/2018 | Lussier et al. | |
| 2020/0062017 A1* | 2/2020 | Irving | B41M 5/5218 |
| 2020/0062986 A1* | 2/2020 | Dannhauser | C09D 11/322 |

* cited by examiner

METHOD FOR INKJET PRINTING

CROSS-REFERENCE TO RELATED APPLICATIONS

Reference is made to the following co-pending and commonly assigned patent applications, the disclosures of all of which are incorporated herein by reference:

U.S. Pat. No. 10,858,529, by Irving and Dannhauser;
U.S. Pat. No. 10,730,331, by Dannhauser and Irving;
U.S. Publication No. 2020/0062017, filed Aug. 21, 2018, by Irving and Dannhauser, and recently allowed;
U.S. Ser. No. 16/551,868, filed Aug. 27, 2019, by Sowinski, Lussier, Griffin, Putnam, and Bugner, and entitled "Ink Set for Inkjet Printing";
U.S. Ser. No. 16/551,908, filed Aug. 27, 2019, by Irving, Putnam, Sowinski, Lussier, Griffin, and Bugner, and entitled "Article Prepared by Inkjet Printing" and recently allowed;
U.S. Ser. No. 16/551,924, filed Aug. 27, 2019, by Putnam, Irving, Bugner, Sowinski, Griffin, and Lussier, and entitled "Laminated Article" and recently allowed; and
U.S. Ser. No. 16/551,942, filed Aug. 27, 2019, by Putnam, Irving, Bugner, Griffin, Lussier, and Sowinski, and entitled "Method of Preparing Laminated Article".

FIELD OF THE INVENTION

This invention relates to the field of inkjet printing using aqueous pigment-based inks applied to ink-receptive media. More particularly, it relates to a method for inkjet printing using one or more aqueous pigment-based inks that contain one or more pigment colorants and a unique selection of humectants. Monochrome or polychrome inkjet-printed images can be provided by the present invention on various ink-receptive media.

BACKGROUND OF THE INVENTION

High speed digital inkjet printing systems have recently found considerable success in competing with traditional analog printing presses in applications such as commercial printing and publishing. In particular, inkjet printing systems that employ aqueous pigment-based inks can rival the print quality and productivity of printing systems that are based on analog impact printing, such as lithography, gravure, and flexographic printing systems. The ability of digital inkjet printing systems to print either short-run lengths or continuously variable information in a cost-effective manner offers distinct advantages over such traditional impact printing systems that require the presses to be idled between print jobs.

More recently, high productivity digital inkjet printing systems have been targeted toward décor and packaging printing, with the same advantages. However, such printing, unlike commercial printing and publishing, typically employ water-impermeable substrates such as polymeric films, metal foils, and glass, in addition to paper-based substrates on which images are printed. Plastic substrates are particularly challenging for the use of aqueous pigment-based inks due to the difficulty in getting such inks to wet and adhere to such substrates that are typically designed and chosen to repel or otherwise present a barrier to water. Although solvent-based and radiation-curable (for example UV-curable) inkjet inks have been used with some success on plastic substrates, their use is limited to certain types of inkjet printing systems, such as piezoelectric drop-on-demand (DOD) systems and they present some health, safety, and environmental concerns compared to the use of aqueous-based inks.

When aqueous-based inks are used in high-speed digital inkjet printing, especially inks that contain more than 80 weight % of water and less than 15 weight % of organic co-solvents (also known as "humectants") and deposited on commonly available plastic substrates used for décor and packaging application, the ink drops tend to either bead up or flow across the substrate surface, resulting in significant defects known as mottle, coalescence, and intercolor bleeding. In addition, such inks are difficult to dry quickly due to the presence of the co-solvents, resulting in a very sticky or tacky printed layer or image.

The literature has proposed a number of ways to overcome the noted problems, for example, the incorporation of additives into the inks that change their viscosity when heated on the plastic substrate; the addition of polymer particles to fuse during heating after printing; the heating of the ink containing mixtures of co-solvents during printing; the use of a "fixing" fluid and ink with specific co-reactive polymers; the use of an adhesive layer on the water-impermeable substrate surface; the surface treatment of the water-impermeable substrate prior to inkjet printing, including the use of protective overcoats; and the use of high-boiling co-solvents in "fixing" fluids to modify the substrate surface.

It is also well known to deposit aqueous pigment-based inks onto a substrate having cations of a multivalent metal salt on the surface thereof. The presence of such multivalent metal cations can be used to prevent deposited ink drops from penetrating too far below the surface of a water-absorptive substrate, thereby preventing a lowering of optical density. The multivalent metal cations can also be used to prevent bleeding or coalescing of adjacent deposited ink drops of the same or different colors on a less absorbent substrate such as a water-impermeable substrate, thereby preventing the formation of blurry or grainy appearing images. Surface treatments comprising aqueous salts of multivalent metal ions are particularly advantageous for high speed printing with page-wide inkjet arrays whereby adjacent drops of ink are deposited within just a few microseconds of each other onto the substrate.

U.S. Pat. No. 9,434,201 (Dannhauser et al.) describes inkjet receiving media suitable for high speed inkjet printing, which media include a substrate having a topmost layer coated thereon comprising an aqueous soluble salt of a multivalent metal cation and a cross-linked hydrophilic polymer binder.

In U.S. Patent Application Publication 2011/0279554 (Dannhauser et al.), it is proposed to modify water-impermeable substrates by applying a pre-coating composition comprising water-soluble salts of multi-valent metal cations in combination with hydrophilic binders. While application of such pre-coats can improve the adhesion of aqueous pigment-based inks during high-speed inkjet printing, the adhesion and wetting may need improvement. Moreover, high-boiling co-solvents or humectants present in such aqueous pigment-based inks cannot readily penetrate into the substrate, leading to prolonged tackiness in the resulting printed image.

U.S. Pat. No. 8,562,126 (Xiang et al.) describes pre-treatment of glossy, semi-glossy, and matte-coated paper substrates for inkjet printing using a coating composition containing an aqueous salt of a multi-valent metal cation, a polyelectrolyte comprising amidine moieties, and another polymer such as a polyamide-epichlorohydrin, a polyamine solution polymer, or a water-based polyurethane. Waxes can be added to such compositions as described in U.S. Patent Application Publication 2003/0203134 (Sheng).

U.S. Pat. No. 9,376,582 (Dannhauser et al.) and U.S. Pat. No. 9,573,349 (Dannhauser et al.) provide a solution to the noted problems with a multi-structural substrate having a water-impermeable support (such as a thin plastic film), a first layer that contains a water-based tie-layer composition, and a second layer (aqueous-based ink-receptive layer) containing an aqueous-soluble salt of a multivalent cation and a hydrophilic binder polymer. One or more aqueous pigment-based inks can be applied to this multi-structural substrate to form an inkjet printed image, particularly when the pigments are anionically-stabilized and water-dispersible pigments. Additional layers can be applied to the inkjet printed images if desired. In particular, it can be advantageous to add an adhesive layer to the inkjet printed image so that another water-impermeable film can be laminated thereto to produce laminated flexible packaging with an "embedded" inkjet printed image.

However, it has been found recently that when the aqueous pigment-based inks used in these methods and with such multi-structural substrates, which contain certain humectants well known in the art, the final laminated flexible packaging material exhibits poor lamination bond strength and delamination can occur. There is a need to solve this problem without sacrificing high-speed inkjet printing and essential operational properties such as stable and accurate jetting, high productivity, machine throughput, and printed image quality. There is also a need to improve the adhesion of the aqueous-based ink-receptive layer directly to a water-impermeable substrate, thereby eliminating the need for a separate water-based tie-layer composition as required in the multi-layer structures methods disclosed in U.S. Pat. Nos. 9,376,582 and 9,573,349 (both noted above).

SUMMARY OF THE INVENTION

The present invention provides a method for inkjet printing, comprising, in order:

A') providing an ink receptive medium comprising a substrate and an aqueous-based ink-receptive layer disposed thereon, which aqueous-based ink-receptive layer has an outer surface, and comprises:
  (a) one or more water-soluble salts of a multivalent metal cation in an amount of at least 0.6 weight % and up to and including 49 weight %;
  (b) one or both of a polyvinyl alcohol and a polyvinyl amine, or a copolymer derived from a vinyl alcohol and a vinyl amine, in a total amount of at least 0.5 weight % and up to and including 30 weight %;
  optionally, (c) a crosslinking agent in an amount of at least 0.01 weight % and up to and including 5 weight %; and
  optionally, (d) silica particles in an amount of up to and including 30 weight %,
  all amounts (a), (b), (c), and (d) being based on the total weight of the aqueous-based ink-receptive layer; and B) depositing directly onto the outer surface of the aqueous-based ink-receptive layer, one or more aqueous pigment-based inks to provide an image of one or more deposited anionically-stabilized pigment colorants,
  each aqueous pigment-based ink having at least 75 weight % and up to and including 95 weight % of water, and comprising:
  a) one or more anionically-stabilized pigment colorants;
  b) one or more water-miscible humectants that are present in a total amount of at least 1 weight % and up to and including 20 weight %, and consist essentially of compounds, each of which has a carbon atom to oxygen atom ratio of at least 1.0:1.0 and only two hydroxy groups; and
  optionally,
  c) an acidic polymer that is an anionic polyurethane, an acidic acrylic polymer, an acidic styrene-acrylic polymer, or any combination of these materials, each acidic polymer having an acid number of at least 50 and up to and including 240, and each acidic polymer being neutralized with sufficient base to render it dispersible or soluble in each aqueous pigment-based ink,
  wherein the weight % amounts of water and of the b) water-miscible humectants are based on the total weight of each aqueous pigment-based ink.

In addition, the present invention provides a method for inkjet printing, comprising, in order:

A) providing a substrate;

A') depositing an aqueous-based ink-receptive layer composition on an outer surface of the substrate to form an aqueous-based ink-receptive layer on the outer surface of the substrate, thereby forming an ink receptive medium, wherein the aqueous-based ink-receptive layer has an outer surface, and comprises:
  (a) one or more water-soluble salts of a multivalent metal cation in an amount of at least 0.6 weight % and up to and including 49 weight %;
  (b) one or more of a polyvinyl alcohol and a polyvinyl amine, or a copolymer derived from a vinyl alcohol and a vinyl amine, in a total amount of at least 0.5 weight % and up to and including 30 weight %;
  optionally, (c) a crosslinking agent in an amount of at least 0.01 weight % and up to and including 5 weight %; and
  optionally, (d) silica particles in an amount of up to and including 30 weight %,
  all amounts (a), (b), (c), and (d) being based on the total weight of the aqueous-based ink-receptive layer;

B) depositing directly on the outer surface of the aqueous-based ink-receptive layer, one or more aqueous pigment-based inks to provide an image of one or more deposited anionically-stabilized pigment colorants,
  each aqueous pigment-based ink having at least 75 weight % and up to and including 95 weight % of water, and comprising:
  a) one or more anionically-stabilized pigment colorants;
  b) one or more water-miscible humectants in a total amount of at least 1 weight % and up to and including 20 weight %, and consisting essentially of compounds, each of which has a carbon atom to oxygen atom ratio of at least 1.0:1.0 and only two hydroxy groups; and
  optionally,
  c) an acidic polymer that is an anionic polyurethane, an acidic acrylic polymer, an acidic styrene-acrylic polymer, or any combination of these materials, each acidic polymer having an acid number of at least 50 and up to and including 240, and each acidic polymer being neutralized with sufficient bases to render it dispersible or soluble in each aqueous anionically-stabilized pigment-based ink,
  wherein the weight % amounts of water and the b) water-miscible humectants are based on the total weight of each aqueous pigment-based ink;
and optionally, D) forming a functional layer on the one or more deposited anionically-stabilized pigment colorants.

In particular embodiments, the present invention provides a method for inkjet printing, comprising, in order:

A') providing an ink receptive medium comprising a water-impermeable substrate and an aqueous-based ink-receptive layer disposed thereon, which aqueous-based ink-receptive layer has an outer surface, and comprises:
(a) one or more water-soluble salts of a multivalent metal cation in an amount of at least 1 weight % and up to and including 24 weight %;
(b) one or both of a polyvinyl alcohol and a polyvinyl amine, or a copolymer derived from a vinyl alcohol and a vinyl amine, in a total amount of at least 1 weight % and up to and including 20 weight %;
(c) a crosslinking agent in an amount of at least 0.1 weight % and up to and including 2 weight %; and
(d) silica particles in an amount of up to and including 10 weight %,
all amounts (a), (b), (c), and (d) being based on the total weight of the aqueous-based ink-receptive layer; and
B) depositing directly onto the outer surface of the aqueous-based ink-receptive layer, two or more aqueous pigment-based inks, defined as follows, to provide an inkjet-printed image comprising two or more deposited anionically-stabilized pigment colorants,
each of the two or more aqueous pigment-based inks comprising:
a) one or more anionically-stabilized pigment colorants defined as follows, wherein 50% of the volume of each the a) one or more anionically-stabilized pigment colorants is provided by pigment colorant particles having a diameter of less than 100 nm, and 95% of the volume of each the a) one or more anionically-stabilized pigment colorants is provided by pigment colorant particles having a diameter of less than 150 nm, the particle size diameters being measured using a dynamic light scattering particle sizing instrument;
b) one or more water-miscible humectants defined as follows; and
c) an acidic polymer that is an anionic polyurethane, an acidic acrylic polymer, an acidic styrene-acrylic polymer, or any combination of these materials, each acidic polymer having an acid number of at least 50 and up to and including 240, each acidic polymer being neutralized with sufficient base to render it dispersible or soluble in each aqueous pigment-based ink,
wherein the two or more aqueous pigment-based inks are selected from the following:
an aqueous cyan pigment-based ink that comprises one or more anionically-stabilized cyan pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %;
an aqueous magenta pigment-based ink that comprises one or more anionically-stabilized magenta pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %;
an aqueous yellow pigment-based ink that comprises one or more anionically-stabilized yellow pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %; and
an aqueous black pigment-based ink that comprises one or more anionically-stabilized black pigment colorants, and the b) one or more water-miscible humectants consists essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 5 weight % and up to and including 10 weight %,
all amounts being based on the total weight of the respective aqueous pigment-based ink.

The present invention provides a solution to the delamination problem described above. Modification of the aqueous-based ink-receptive layer improves its capability to absorb residual humectants of specific classes from the aqueous pigment-based inks after drying, thereby improving lamination bond strength. At the same time, the improved aqueous-based ink-receptive layer provides the option of omitting water-based "tie" layers from between a water-impermeable substrate and an inkjet printed image. Minimization or exclusion of certain common humectant compounds from, and inclusions of other specific humectant compounds within, the aqueous pigment-based inks also improves lamination bond strength. Specifically, the present invention utilizes only dihydroxy humectants in which the carbon atom to oxygen atom molar ratio is at least 1.0:1.0 and up to and including 2.7:1.0, and 1,2,3-trihydroxypropane (glycerol) is used as little as possible, or omitted entirely. The dihydroxy humectants with carbon atom to oxygen atom molar ratio of at least 1.0:1.0 simultaneously provide aqueous pigment-based inks that exhibit stable jet formation without suffering ink drying on the printhead nozzle plate, which problem produces blocked nozzles, crooked jets and ragged jet curtains, or poor printhead start-ups after extended shutdowns. Stable and robust drop formation is essential for accurate printing without interference from excessive printhead maintenance service cycles. These features are described in more detail below.

DETAILED DESCRIPTION OF THE INVENTION

Figure 1:
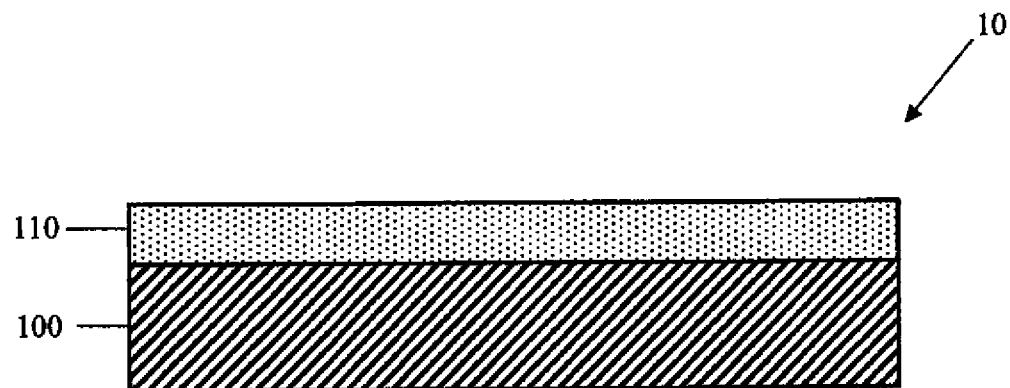
FIG. 1 shows a partial cross-sectional view of a simple embodiment of an aqueous-based ink receiving medium used in the practice of the present invention.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described in the discussion of any specific embodiment.

Definitions

As used herein to define various components of aqueous pigment-based inks, aqueous-based ink-receptive layers, inkjet printed images or layers, functional layers, and other materials used in the practice of this invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, unless otherwise indicated, the disclosure of these ranges is intended as a continuous range including every value between the minimum and maximum values as well as the end points of the ranges.

As used herein, the parameter "acid number" (also known as acid value) is defined as the milligrams (mg) of potassium hydroxide required to neutralize 1 g of the described acidic polymer.

The term "aqueous" in aqueous organic pigment dispersions, aqueous compositions, and aqueous (anionically-stabilized) pigment-based inks according to the present invention means that the water content is greater than 60 weight %, or at least 80 weight % based on the total weight of all solvents. Thus, water is the predominant solvent in such formulations.

The terms "water-soluble" and "aqueous-soluble" mean that 1 mass part of solute material can be dissolved in as little as less than 1 mass part (that is, more soluble solute) and in as much as 1,000 mass parts (that is, less soluble solute) of distilled water at 25° C. to provide a homogeneous and visibly clear solution.

The term "humectant" is defined as a water-miscible co-solvent that slows down the rate of evaporation of an aqueous-based ink, thereby delaying insolubilization or precipitation of the solid components of the ink. As such, a humectant has a higher boiling point and a lower vapor pressure at a given temperature than water such that it is more difficult to evaporate than water. Thus, humectants are water miscible polar organic compound (typically a low volatility solvent having a boiling point at sea level near or greater than about 200° C.), or a combination of such compounds, that retards water evaporation from an aqueous-based ink to reduce printhead jetting failures due to blocked nozzles or crooked jets resulting from the formation of dried ink deposits.

Aqueous pigment-based ink and fluid dynamic viscosity can be measured by any of well-known techniques. Preferred methods include measurement of the timing of mass flow through a capillary as in a capillary viscometer, or measurement of ball drop velocity through a fluid, using for example a rolling ball viscometer. Both a capillary flow viscometer and a commercially available Anton Paar Automated MicroViscometer (AMVn) employing the rolling ball technique can be used to measure the dynamic viscosities reported herein. All aqueous pigment-based ink dynamic viscosity values disclosed herein were measured under gravity induced shear at approximately 24° C. to 26° C. It will be appreciated that the values cited are reported as centipoise (cP) or millipascal seconds (mPa-sec) and that 1 $cP=10^{-3}$ Pascal-seconds (Pa-s) equals $10^{-2}$ dyne-s/cm². While viscosities can be measured with high precision, viscosity values here are reported to one or two decimal places only, and they are normally rounded values and not truncated values. All claims reciting aqueous pigment-based ink viscosities are intended to be interpreted in terms of values in mPa-sec normally rounded to one decimal point. Thus, the various aqueous pigment-based inks can have a dynamic viscosity of up to and including 10 centipoise (10 mPa-sec), but more likely the values described below.

The Wilhelmy plate method is a well-known technique for measuring the static surface tension of an aqueous pigment-based ink or service fluid at a solid interface. The technique involves a plate of known dimensions, typically selected from a roughened platinum alloy, suspended from a balance. The plate is contacted with a solution of interest and a vertical force is applied to the plate to form a liquid meniscus between the solution and plate. The resulting surface tension is given according to equation (1):

$$\sigma = F/L \cos(\theta) \qquad (1)$$

where $\sigma$ is the surface tension of the liquid, F is the force acting on the balance (milli-Newtons/meter), L is the wetted length of the plate in millimeters, and $\theta$ is the contact angle between the plate and solution.

Typically, the roughened platinum results in a contact angle very close to zero and the cosine of $\theta$ goes to 1. A complete theoretical treatment of the method can be found in, for example, "A Method for Determining Surface and Interfacial Tension Using a Wilhelmy Plate," *Colloid and Polymer Science*, 255 (7), pages 675-681. A number of commercially available instruments are known for measuring surface tension, however, the instrument used to report surface tension values in the present invention is a Krüss Model K10ST tensiometer.

Particle size for the various a) pigment colorants (including anionically-stabilized pigment colorants) refers to the approximate diameter of a generally spherical pigment particle or to the approximate largest characteristic dimension of a non-spherical particle. The 95th percentile particle size refers to the classified particle size distribution such that 95% of the pigment colorant particles is provided by particles having diameters smaller than the indicated diameter. Similarly, the 50th percentile particle size (or median particle size) refers to the classified particle size distribution such that 50% of the pigment colorant particles is provided by particles having diameters smaller than the indicated diameter. Such particle size measurements can be made using either laser diffraction (static) techniques or dynamic light scattering techniques. Laser diffraction techniques will provide a "volume" weighted particle size distribution, whereas dynamic light scattering techniques will provide an "intensity" weighted distribution. For the particle size distributions reported below in the working examples, a Nanotrac 150 NPA ultrafine particle analyzer (Microtrac, Inc.) was used. This is a dynamic light scattering device, and standard procedures for using such a device are described in National Institute of Standards and Technology (NIST) Special Publication 1200-6, *Measuring the Size of Nanoparticles in Aqueous Media Using Batch-Mode Dynamic Light Scattering NIST-NCL Joint Assay Protocol*, PCC-1 *Version* 1.2, May 2015 and in ISO 22412:2017 *Particle Size Analysis—Dynamic Light Scattering* (*DLS*). This dynamic light scattering device can be used to measure particle size distributions in "intensity" mode, but it is also capable of being used to calculate and report the "volume" mode particle size distributions for comparative purposes.

As used herein, "ink set" refers to two or more different aqueous pigment-based inks that can be sold or supplied in separate containers of the same or different sizes by a manufacturer or vendor. An ink set also refers to the collection of aqueous pigment-based inks and any clear fluids that are used in individual fluid supplies (or reservoirs) incorporated into specific inkjet printing equipment that are designed for accommodating a specific volume of each aqueous pigment-based ink. An ink set can also be identified with a unique catalog number for sale, or the ink set can be assembled by a supplier or user from individual aqueous pigment-based inks having individual catalog numbers.

For clarification of definitions for any terms relating to polymers, reference should be made to "Glossary of Basic Terms in Polymer Science" as published by the International Union of Pure and Applied Chemistry ("IUPAC") in *Pure Appl. Chem.* 68, 2287-2311 (1996). However, any definitions explicitly set forth herein should be regarded as controlling.

As used herein, the terms "polymer" and "polymeric" refer to both homopolymers and copolymers, each having a stated weight distribution average molecular weight ($M_w$) as measured using gel permeation chromatography (polystyrene standard).

The term "copolymer" refers to polymers derived from two or more different monomers that provide two or more different repeating or recurring units of different chemical structures arranged, in random order or predetermined order, along the polymer backbone. The term "backbone" refers to the chain of atoms in a polymer to which a plurality of pendant groups can be attached. An example of such a backbone is an "all carbon" backbone obtained from the polymerization of one or more ethylenically unsaturated polymerizable monomers. However, other backbones can include heteroatoms wherein the polymer is derived by condensation reactions or some other means.

The a) pigment colorants used in the various embodiments of the present invention are not generally self-dispersing, meaning that they require the presence of one or more organic polymeric pigment dispersants bound to some fraction of the surface of the pigment particles to keep them suspended in an aqueous medium, but suitable self-dispersed pigmented colorants can readily be employed in the practice of the invention.

The term "weight %" of an aqueous pigment-based ink component within the composition is the ratio of the weight of that component to the total weight of the composition (the weight fraction) multiplied by 100 in order to be expressed as percentage by weight (parts per 100), sometimes abbreviated as wt. % or as w/w %. It is a convenient way of expressing the composition of a mixture in a dimensionless size.

As used herein, the term "layer" or "coating" can consist of one disposed or applied layer or a combination of several sequentially disposed or applied layers, such as sub-layers.

As used herein in reference to various materials used in supports, substrates, or layer, the term "water-impermeable" refers to a water vapor transmission (WVTR) rate of less than about 500 g/m²/day/bar at 38° C. and 90% RH, as measured by test cells and instrumentation in accord with, for example, ASTM F1249, for measuring the WVTR of plastic films.

Uses

The aqueous pigment-based inks (including aqueous anionically-stabilized pigment-based inks), inkjet-printed articles, and flexible inkjet-printed articles according to the present invention can be used in or prepared using aqueous inkjet printing methods, including those utilizing continuous inkjet printing apparatus and systems described in more detail below. The resulting articles can be used in any suitable manner where inkjet-printed images are needed, including but not limited to flexible packaging materials and décor materials used in various industries.

Aqueous-Based Ink-Receptive Layer and Aqueous Compositions

The aqueous-based ink-receptive layer compositions (or "aqueous compositions" hereinafter) used to provide aqueous-based ink-receptive layers according to the present invention generally have at least 2% solids and up to and including 50% solids, or even at least 4% solids and up to and including 25% solids, the rest of the aqueous composition being predominantly a solvent medium consisting essentially of water as described below. The various "dry" amounts of the components described below can be achieved using appropriate amounts of those components in the aqueous compositions in view of the noted % solids.

The aqueous compositions must comprise one or more (a) water-soluble salts of multivalent metal cations as a first essential component. Mixtures of such salts having the same multivalent metal cation, and mixtures of salts having different multivalent cations can be used, in any desired proportion. Generally, each of these salts is colorless and non-reactive with other materials in the aqueous compositions. For example, such salts can comprise one or more multivalent cations such as magnesium (+2), calcium (+2), barium (+2), zinc (+2), or aluminum (+3). The magnesium (+2) and calcium (+2) cations are particularly useful, in combination with suitable counterions.

Examples of useful (a) water-soluble salts of a multivalent metal cation include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Hydrated versions of these salts can also be used. Other useful salts would be readily apparent to a skilled artisan. Particularly useful water-soluble salts of a multivalent metal cation comprise one or more of $CaCl_2$, $Ca(CH_3CO_2)_2$, $MgCl_2$, $Mg(CH_3CO_2)_2$, $Ca(NO_3)_2$, and $Mg(NO_3)_2$, and hydrated versions of these salts. Such materials can be obtained from various commercial sources.

The amount of the (a) water-soluble salts of multivalent metal cations in the aqueous composition can be determined using routine experimentation to obtain a dry aqueous-based ink-receptive layer amount of at least 0.6 weight % or at least 1 weight %, and up to and including 24 weight %, or even up to and including 49 weight %, all based on the total weight of the aqueous-based ink-receptive layer from which the solvent medium has been removed. For example, it is useful to provide the (a) one or more water-soluble salts of a multivalent metal in the aqueous-based ink-receptive layer in an amount of at least 0.01 g/m$^2$ and up to and including 1 g/m$^2$.

The amount of the (b) one or both of a polyvinyl alcohol and a polyvinyl amine, or a copolymer derived from a vinyl alcohol and a vinyl amine, as another essential component in the aqueous composition can also be determined using routine experimentation to obtain a dry aqueous-based ink-receptive layer amount of at least 0.5 weight %, or at least 1 weight %, and up to and including 20 weight %, or up to and including 30 weight %, based on the total weight of the aqueous-based ink-receptive layer. These amounts refer to the total amount of all of the polyvinyl alcohol and polyvinyl amine that are present. Such materials are generally capable of absorbing water and of forming a continuous phase solution.

The term "polyvinyl alcohol" is meant to include a polymer of various weight average molecular weights having the —CH(OH)—CH$_2$— recurring unit as well as modified polyvinyl alcohols or derivatives of polyvinyl alcohol in which the hydroxy group of one or more recurring units has been replaced with a different organic moiety (thus, a modified recurring unit). Such materials include but not limited to an acetylacetate-modified poly(vinyl alcohol), ethylene oxide-modified poly(vinyl alcohol), polyvinyl butyral derivatives, polyvinyl formal derivatives, any other materials that would be readily apparent to one skilled in the art from this teaching. Such polymers can be derived from one or more vinyl alcohol monomers (or derivatives thereof) or they can be derived from the vinyl alcohol monomer that is then modified after polymerization. While some useful polyvinyl alcohols are crosslinkable, others are not. In crosslinked form, such materials provide resistance to abrasion in the wet formulation and increased cohesion in a dry coating.

Useful polyvinyl alcohols generally have a weight average molecular weight (M$_w$) of at least 3,000 and up to and including 150,000.

Useful polyvinyl alcohols are available from various commercial sources under various tradenames such as ELVANOL™, GOHSENOL™, and EXCEVAL™.

The term "polyvinyl amine" refers to polymers having —CH(NH$_2$)CH$_2$— recurring units. Useful materials are available, for example, from BASF Aktiengesellschaft under the tradename LUPAMIN™. Such polymers can be derived from a vinyl amine monomer or modified monomers.

Moreover, useful polyvinyl amines generally have a weight average molecular weight (M$_w$) of at least 10,000 and up to and including 1,000,000.

In some embodiments, it is desirable that the weight ratio of the essential (a) one or more water-soluble salts of a multivalent metal cation to the essential (b) one or more of a polyvinyl alcohol and a polyvinyl amine is from 0.02:1 to and including 100:1, or from 0.1:1 to 50:1.

Moreover, in some embodiments, both a polyvinyl alcohol and a polyvinyl amine are present in the aqueous-based ink-receptive layer, in a weight ratio of the polyvinyl alcohol to the polyvinyl amine of from 0.1:1, or to a copolymer derived from a vinyl alcohol and a vinyl amine (as described below), to and including 20:1, or from 0.5:1 to and including 10:1.

Also useful are copolymers, each of which is derived from a monomer mixture of a vinyl alcohol monomer as defined above (or a mixture of such monomers) and a vinyl amine as defined thereof (or a mixture of such monomers) to produce the desired —CH(OH)—CH$_2$— (or modified recurring unit as described above) and —CH(NH$_2$)CH$_2$— recurring units in the copolymer. The molar ratios of the various monomers and recurring units can be adjusted using known skill and routine experimentation to achieve the desired results in the aqueous-based ink-receptive layer. Mixtures of such copolymers can be used if desired. One or more copolymers can be used in combination with a polyvinyl alcohol or polyvinyl amine, as they are defined above.

It may be useful to include one or more (c) crosslinking agents in the aqueous composition to promote crosslinking of one or both of the polyvinyl alcohol and polyvinyl amine, or of other materials that are present. However, while such (c) crosslinking agents are desirable, they are optional. The identity and amount of crosslinking agent will depend upon the choice and amount of crosslinkable material present and its reactivity with the crosslinking agent, the number of crosslinking sites available, its compatibility with other materials in the aqueous composition, and manufacturing constraints such as solution pot life and coating drying speed. Representative crosslinking agents include but are not limited to, glyoxal, CARTABOND® TSI and EPI (Clariant), SEQUAREZ™ 755 (Omnova), glutaraldehyde sodium bisulfate complex (Aldrich), Sunrez 700 M and 700C (Omnova), bis(vinyl) sulfone), bis(vinyl)sulfone methyl ether, adipoyl dihydrazide, epichlorohydrin polyamide resins, and urea-formaldehyde resin. Useful crosslinking agents can be obtained from various commercial sources.

The one or more (c) crosslinking agents can be present in the aqueous-based ink-receptive layer in a dry layer amount of at least 0.01 weight % or of at least 0.1 weight %, and up to and including 2 weight % or up to and including 5 weight %, based on the total weight of the aqueous-based ink-receptive layer. Routine experimentation can be carried out by a skilled artisan to determine the amount of one or more (c) crosslinking agents to include in an aqueous composition to obtain the desired "dry" amounts.

It is also optional but desirable to include one or more types of (d) silica particles in the aqueous composition in a dry layer amount of up to 10 weight % or up to and including 30 weight %, based on the total weight of the aqueous-based ink-receptive layer. The minimum amount present can be at least 1 weight % or even at least 5 weight %. For example, silica gel, silica (such as fumed silica or colloidal silica) can be present. Such materials can be obtained from various commercial sources. A skilled artisan would know from these amount using routine experimentation how much of the silica particles to include the aqueous composition.

The aqueous composition (and resulting aqueous-based ink-receptive layer) can also contain various other addenda that would provide certain desirable properties, including wax particles as known in the art. In addition, the aqueous composition (and resulting aqueous-based ink-receptive layer) can include the composite particles described in co-pending and commonly assigned U.S. Ser. No. 16/106,033 noted above, in the amounts described therein, the disclosure of which is incorporated herein by reference.

The aqueous compositions can be prepared by suitably mixing the various essential and optional materials described above in any desired mixing order and with suitable equipment, in a solvent medium that is predominantly water. At least 60 weight %, or even at least 80 weight % and up to and including 100 weight %, of the solvent medium is comprised of water, based on the weight of all solvents. The possible % solids is noted above.

The aqueous composition used in the practice of this invention can have a dynamic viscosity, measured at 25° C. using a standard rolling ball viscometer, of less than or equal to 200 centipoise (200 mPa-sec), of less than or equal to 50 centipoise (50 mPa-sec), or of less than or equal to 20 centipoise (200 mPa-sec) for appropriate coating such as using a CIJ printing system described below.

Preparation of suitable aqueous-based ink-receptive layers are described below using appropriate aqueous compositions. Desirably, the dry coverage of the aqueous-based ink-receptive layer is at least 0.3 $g/m^2$ or at least 0.75 $g/m^2$ and up to and including 1.5 $g/m^2$ or up to and including 3 $g/m^2$.

Representative aqueous compositions and their use according to the present invention are described below within the working Examples.

Aqueous Pigment-Based Inks and Ink Sets

The methods and articles according to the present invention can be accomplished using a single aqueous pigment-based ink, or by using multiple different aqueous pigment-based inks, including the two or more different aqueous pigment-based inks (of the same or different hue) that can be supplied to a user as part of an ink set according to the present invention.

Each aqueous pigment-based ink useful according to the present invention can be prepared from a suitable aqueous dispersion of a) one or more pigment colorants using known dispersants and dispersing means. The resulting dispersed pigment colorants can be mixed with the b) one or more water-miscible humectants (identified below) and optional c) acidic polymer and other additives described below, and all components are formulated within an aqueous medium (predominantly water) to provide an ink formulation having a dynamic viscosity of at least 1 centipoise (1 mPa-sec) and up to and including 10 centipoise (10 mPa-sec), or less than or equal to 5 centipoise (5 mPa-sec), or less than or equal to 3 centipose (3 mPa-sec), or even less than 1.5 centipoise (1.5 mPa-sec), all measured at 25° C. as described above.

In many embodiments according to the present invention, the a) one or more pigment colorants used according to the present invention can be "anionically-stabilized" as described below, and thus, the resulting formulations are "aqueous anionically-stabilized pigment-based inks." In the following discussion, the a) one or more pigment colorants can be a) one or more anionically-stabilized pigment colorants using stabilizing dispersants or compounds such as anionic polymer or non-polymeric stabilizers, or they can be stabilized with anionic stabilizing groups on the surface of the pigment particles ("self-dispersed").

Organic anionic polymer dispersed pigment colorants are useful in the practice of this invention and can be used singly, or in combinations of two or more different organic polymers or otherwise-dispersed pigment colorants, to provide any desired color or hue.

The exact choice of a) one or more pigment colorants will depend upon the specific application, performance, color reproduction, and image stability that are desired. Useful organic polymer-dispersed pigment colorants are described for example in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference.

Useful a) one or more pigment colorants that can be dispersed with organic polymers include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon blacks. Representative a) one or more pigment colorants are described in Col. 7 (line 48) to Col. 8 (line 5) of U.S. Pat. No. 8,173,215 (Sowinski et al.), the disclosure of which is incorporated herein by reference.

Useful a) one or more pigment colorants can be accompanied or dispersed using suitable polymer dispersants that are well known in the art (as cited above). Representative useful anionic organic polymer dispersants can be prepared from at least one anionic hydrophilic monomer such as an acrylic acid or methacrylic acid monomer, or combinations thereof, and for example, at least one monomer comprised of a hydrophobic methacrylate or acrylate monomer having an aliphatic chain having 12 or more carbon atoms, as described for example in U.S. Patent Application Publication 2007/0043144 (House et al.), the disclosure of which is incorporated herein by reference. Further details of useful organic polymer dispersants, including useful monomer recurring units, monomer amounts, and $M_w$, are provided in Col. 5 (line 45) to Col. 6 (line 31) of U.S. Pat. No. 8,173,215 (noted above). For example, many useful organic (anionic) polymer dispersants are anionic acrylic polymers formed from at least one anionic hydrophilic monomer described above having a weight average ($M_w$) molecular weight of at least 500 Daltons but less than 100,000 Daltons, and more likely up to and including 15,000 Daltons, or up to and including 10,000 Daltons.

One or more organic polymer dispersants for the a) one or more pigment colorants can be present in an amount that would be readily apparent to one skilled in the art depending upon the aqueous medium, the chosen particulate colorants, and other components of the aqueous pigment-based ink.

In addition to the polymeric dispersants, nonionic or anionic surfactants can be present with the a) one or more pigment colorants as is known in the art. Representative materials of this type include but are not limited to, sodium dodecylsulfate or sodium oleylmethyltaurate as described for example in Col. 7 (lines 15-23) of U.S. Pat. No. 8,173,215 (noted above).

Each aqueous pigment-based ink useful in the practice of this invention typically comprises a) one or more pigment colorants that will provide the desired color or hue such as black, green, red, yellow, blue, violet, magenta, cyan, white, brown, grey and other hues known or achievable using known color blending technology. Desired colors can be obtained using a) one or more pigment colorants that are designed to absorb electromagnetic radiation so that specific a* and b* CIELAB chromaticity parameters are met to provide a desired hue. Thus, pigment colorants can be present individually or in mixtures in each aqueous pigment-based ink. For example, individual aqueous pigment-based inks useful in the present invention can comprise a) one or more pigment colorants selected from a cyan pigment, a magenta pigment, a yellow pigment, a black pigment, a green pigment, an orange pigment, a white pigment, a red pigment, a blue pigment, a violet pigment, and a combination of any of these pigment colorants, any and all of which can be anionically-stabilized pigment colorants for example using anionic organic polymer stabilizers.

Some organic and inorganic a) one or more pigment colorants can be used combination. For example, a carbon black pigment can be combined with a differently colored pigment such as a cyan copper phthalocyanine or a magenta quinacridone pigment. A combination of yellow and green pigment colorants are described for example, in U.S. Pat. No. 9,828,513 (Lussier et al.), the disclosure of which is incorporated herein by reference. Other useful pigment colorant combinations are described in U.S. Pat. No. 8,455,570 (Lindstrom et al.), the disclosure of which is incorporated herein by reference.

Particle size determination for the a) one or more pigment colorants is defined above. The a) one or more pigment colorants or a) anionically-stabilized pigment colorants have a 50% percentile particle size of less than 150 nm, less than 100 nm, less than 70 nm, or even less than 60 nm. In addition, that have a 95% percentile particles size of less than 300 nm, less than 150 nm, or even less than 110 nm.

In some embodiments, an ink set can comprise aqueous pigment-based inks in which the a) one or more pigment colorants is a cyan pigment, a magenta pigment, a yellow pigment, a black pigment, a green pigment, an orange pigment, a white pigment, a red pigment, a blue pigment, or a violet pigment, and the total of all of the a) one or more pigment colorants independently in each aqueous pigment-based ink comprises at least 0.1 weight % and up to and including 25 weight %, based on the total weight of each aqueous pigment-based ink. As noted above, any or all of these pigment colorants can be anionically-stabilized pigment colorants using any suitable stabilizing dispersant such as an anionic polymer or other anionic material.

In many embodiments, for example, the anionically stabilized pigment colorant can be one or more of an anionically-stabilized cyan pigment, an anionically-stabilized yellow pigment, an anionically-stabilized magenta pigment, an anionically-stabilized green pigment, an anionically-stabilized orange pigment, an anionically-stabilized red pigment, an anionically-stabilized violet pigment, an anionically-stabilized blue pigment, an anionically-stabilized white pigment, or an anionically-stabilized black pigment. A combination of aqueous anionically-stabilized pigment-based inks can be provided as part of an ink set according to the present invention. Upon drying inkjet-printed images obtained using such anionically-stabilized pigment colorants in anionically-stabilized pigment-based inks, the total amount of the anionically-stabilized pigment colorants can be at least 40 weight % and up to and including 60 weight %, based on the total weight of the inkjet-printed image.

The a) one or more pigment colorants can be present independently in each aqueous pigment-based ink in an amount of at least 0.1 weight % or at least 1 weight %, and up to and including 8 weight %, or up to and including 15 weight %, or even up to and including 25 weight %, based on the total weight of the aqueous pigment-based ink.

Useful a) one or more pigment colorants can be obtained from various commercial sources including but not limited to, BASF, Clariant, Sun Chemical, Cabot Corp., and Orion Engineered Carbons.

Each aqueous pigment-based ink, including the two or more different aqueous pigment-based inks incorporated within an ink set, within an article, or used in a method according to the present invention, must comprise b) one or more water-miscible humectants, as defined below, that are generally water miscible organic solvents (or "co-solvents"), and consist essentially of compounds, each of which independently has a carbon atom to oxygen atom ratio of at least 1.0:1.0 or at least 1.3:1.0 and up to and including 2.7:1.0. The carbon atom to oxygen atom ratio can be the same or different for the various b) one or more water-miscible humectants in the respective aqueous pigment-based inks. The humectants do not contain heteroatoms, such as nitrogen or sulfur, but contain only carbon, hydrogen and oxygen atoms.

More specifically, each of the b) one or more water-miscible humectants independently in the one or more different aqueous pigment-based inks typically have only two hydroxy oxygens (in two hydroxy groups). Some useful b) water-miscible humectants can have one or more oxy or ether bond oxygens. For example, each of the b) one or more water-miscible humectants independently in the two or more different aqueous pigment-based inks are consisting essentially of the compounds selected from the following group of compounds:

2-(2-hydroxyethoxy)ethanol and 2-[2-(2-hydroxyethoxy)ethoxy]ethanol ("TEG");
dihydroxyethane (or 1,2-ethanediol);
dihydroxypropanes, such as 1,2-dihydroxypropane (or 1,2-propanediol) and 1,3-dihydroxypropane (or 1,3-propanediol);
dihydroxybutanes, such as 1,2-dihydroxybutane (or 1,2-butanediol), 1,3-dihydroxybutane (or 1,3-butanediol), 2,3-dihydroxybutane (or 2,3-butanediol), 1,4-dihydroxybutane (or 1,4-butanediol), 1,3-dihydroxy-2-methylpropane, and 1-hydroxy-2-hydroxy-2-methylpropane;
dihydroxypentanes, such as 1,2-dihydroxy-n-pentane (or 1,2-n-pentanediol), 1,5-dihydroxy-n-pentane (or 1,5-n-pentanediol).

More particularly, the b) one or more water-miscible humectants independently in the two or more different aqueous pigment-based inks provided in an ink set, or used individually or together, consist essentially of 1,2-ethanediol, 1,2-propanediol, 1,3-propanediol, 1,2-butanediol, 2,3-butanediol, 1,3-butanediol, 1,2-pentanediol, 2,3-pentandiol, 1,3-pentanediol, 2-(2-hydroxyethoxy)ethanol, 2-(2-hydroxyethoxy)ethanol, 2-[2-(2-hydroxyethoxy)ethoxy]ethanol, or a combination of two or more of these compounds.

The b) one or more water-miscible humectants can be present independently in the various aqueous pigment-based inks useful according to the present invention in a total amount of at least 1 weight %, of at least 3 weight % and up to and including 10 weight %, or up to and including 20 weight %, all based on the total weight of the individual aqueous pigment-based ink.

Moreover, it is highly desired that common high boiling humectants of the art, such as 1,2,3-trihydroxypropane (glycerol) and N-methyldiethanolamine, are either entirely absent or are present at very low amounts in all aqueous pigment-based inks used in the present invention. That is, 1,2,3-trihydroxypropane (glycerol), for example, is present in an amount of less than 3 weight %, or desirably less than 2 weight %, or more desirably less than 1 weight %, or even less than 0.5 weight %, based on the total weight of all b) one or more water-miscible humectants. For optimal lamination bond strength in the flexible inkjet printed articles, 1,2,3-trihydroxypropane, N-methyldiethanolamine, and all other high boiling temperature, low vapor pressure humectants should be excluded from all aqueous pigment-based inks.

By "consisting essentially," it is meant that each aqueous pigment ink contains no more than 10 weight %, and particularly from 0 weight % to no more than 5 weight %, based on the total weight of the b) one or more water-miscible humectants, of humectant compounds that do not fall within the scope of the present invention described above (only two hydroxy groups).

Thus, at least 90 weight % of the total weight of b) water-miscible humectants in each aqueous pigment-based ink consists essentially of one or more compounds, each having a carbon atom to oxygen atom ratio of at least 1.0:1.0 and having only two hydroxyl groups. Such compounds having a carbon atom to oxygen atom ratio ("C:O") of at least 1.0:1.0 or at least 1.3:1.0, but up to and including 2.7:1.0 and only two hydroxyl groups can have a range of vapor pressures and boiling point temperatures as pure compounds. The advantages of the present invention can often be furthered by the use of higher proportions of higher vapor pressure, lower boiling temperature humectants than lower vapor pressure, higher boiling temperature humectants in humectant mixtures to aid the removal of the humectants from the printed ink deposit during the ink drying process following ink drop placement on a substrate. Thus it is frequently desirable for the predominant humectant is such a mixture to have a boiling point at 1 atmosphere of at least 190° C. but not greater than 240° C. In a similar vein, it is frequently desirable for the predominant humectant in such a mixture to have a vapor pressure at 1 atmosphere and 25° C. of at least 0.01 mm Hg (1.3 Pa) but not less than 0.001 mm Hg (0.13 Pa). Quite surprisingly, aqueous pigment-based inks useful in the present invention comprised of higher proportions of higher vapor pressure, lower boiling temperature dihydroxy water-miscible humectants, such as 1,2-ethanediol or 1,2-propanediol, do not suffer losses of the humectant during continuous inkjet ink fluid recirculation that can produce significant degrees of water evaporation, and modest humectant levels succeed at producing stable drop formation with normal printhead maintenance cycles. In addition, flexible polymer film webs can be printed at high speed but still dried gently and tack free so as to avoid distorting the web under tension, and also not exhibit back side ink transfer ("offsetting") during roll wind-up and storage.

Mixtures of b) one or more water-miscible humectants can be used as would be appreciated by one skilled in the art in view of the teaching presented herein. Some mixtures are better than others in specific aqueous pigment-based inks having specific a) one or more pigment colorants. It is not known why some individual or mixture of b) one or more humectants are more desirable and solve the problems described herein with specific a) one or more pigments, as compared to others. Routine trial and error can be used to find the optimum compounds and amounts for a given aqueous pigment-based ink. For example, it has been observed that when "TEG" (noted above) is used in a mixture of b) one or more water-miscible humectants, for example in an aqueous yellow pigment-based ink, it is best if the TEG is present as a "minor" (less than 50 weight %) amount of the total weight of b) one or more water-miscible humectants.

In some embodiments, an ink set can comprise an aqueous cyan pigment-based ink that comprises one or more anionically-stabilized cyan pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %, based on the total weight of the aqueous cyan pigment-based ink;

an aqueous magenta pigment-based ink that comprises one or more anionically-stabilized magenta pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %, based on the total weight of the aqueous magenta pigment-based ink;

an aqueous yellow pigment-based ink that comprises one or more anionically-stabilized yellow pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %, based on the total weight of the aqueous yellow pigment-based ink; and an aqueous black pigment-based ink that comprises one or more anionically-stabilized black pigment colorants, and the b) one or more water-miscible humectants consists essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 5 weight % and up to and including 10 weight %, based on the total weight of the aqueous black pigment-based ink.

In such aqueous magenta pigment-based inks, the b) one or more water-miscible humectants can consist essentially of one or both of 1,2-propanediol and 1,2-butanediol together with 2-[2-(2-hydroxyethoxy)ethoxy]ethanol in a weight ratio of 1:1 and up to and including 8:1.

Moreover, in such aqueous black pigment-based inks, the b) one or more water-miscible humectants can consist essentially of one or both of 1,2-propanediol and 1,3-propanediol together with 2-[2-(2-hydroxyethoxy)ethoxy]ethanol in a weight ratio of at least 1:1 and up to and including 8:1.

The useful b) one or more water-miscible humectants can be obtained from various commercial suppliers such as Dow-Dupont, Shell Chemicals, Acros Organics, TCI, Parchem, Alfa-Aesar, Sigma-Aldrich, Hairui, Nexeo, Univar, and Fisher Chemical.

Thus, each aqueous pigment-based ink has the a) one or more pigment colorants and b) one or more water-miscible humectants, as defined, as the only essential components for achieving advantages according to the present invention, especially the delamination improvement described herein. Nothing else is essential for the purpose of achieving the advantages described above.

In some embodiments, however, it may be useful to include an c) acidic polymer, or a mixture thereof, in one or more of the aqueous pigment-based inks, which c) acidic polymer can be chosen from anionic polyurethanes and acidic styrene-acrylic polymers. Each of the c) acidic polymer can have an acid number of at least 50, or of at least 60, and up to and including 160 or up to and including 240, and if necessary, each c) acidic polymer can be neutralized with sufficient base (such as an alkali metal hydroxide or amine) to render it dispersible or soluble in the aqueous pigment-based ink.

Representative examples of both types of c) acidic polymers are described in U.S. Pat. No. 8,430,492 (Falkner et al.), the disclosure of which is incorporated herein by reference. Useful anionic polyurethanes containing a polyether diol unit can be identified as polyether polyurethanes and generally can have a weight average molecular weight ($M_w$) of at least 10,000 and up to and including 30,000 or at least 15,000 and up to and including 25,000. Useful water-soluble or water-dispersible anionic polyether polyurethanes can be prepared as described for example in [0045]-[0049] of U.S. Patent Application Publication 2008/0207811 (Brust et al.), the disclosure of which is incorporated herein by reference. The acidic groups in the anionic polyether polyurethanes can be at least partially and up to 100% neutralized (converted into salts) using monovalent inorganic bases such as alkaline metal hydroxides or organic amines such as dimethylethanolamine.

Representative anionic acrylic polymers and anionic styrene-acrylic polymers useful in the present invention are described also for example in [0061] of U.S. Patent Application Publication 2008/207811 (noted above). Examples of useful anionic styrene-acrylic polymers include those commercially available under the trademark JONCRYL® (BASF).

The useful amounts of such anionic polymers are readily known in the art and can be up to and including 14 weight %, or up to and including 10 weight %, all based on the total weight of the aqueous pigment-based ink. Some of these anionic polymers can be used also as dispersants for the a) one or more pigment colorants.

Other additives optionally present in any of the aqueous pigment-based inks include colorless fluorescent colorants (dyes or pigments) and examples of such compounds are described in U.S. Patent Application Publication 2014/231674 (Cook), the disclosure of which is incorporated herein by reference. Still other optional additives include but are not limited to solvo-surfactants, organic co-solvents, thickeners, conductivity-enhancing agents, drying agents, waterfastness agents, viscosity modifiers, pH buffers, antifoamants, wetting agents, modified polysiloxanes surfactants, non-silicone surfactants, corrosion inhibitors, biocides, fungicides, preservatives or other antimicrobial agents, fragrances or masking fragrances, defoamers (such as SURFYNOL® DF110L, PC, MD-20, and DF-70), UV radiation absorbers, antioxidants, and light stabilizers available under the trademarks TINUVIN® (Ciba) and IRGANOX® (Ciba), as well as other additives described in Col. 17 (lines 11-36) of U.S. Pat. No. 8,455,570 (Lindstrom et al.). The useful amounts of any of these additives would be readily apparent to one skilled in the art using routine experimentation.

In addition, any of the aqueous pigment-based inks can further comprise one or more aqueous-soluble dyes that are well known in the art, for example as described in Col. 12 of U.S. Pat. No. 8,455,570 (noted above).

An aqueous solvent medium is generally present in each aqueous pigment-based ink in an amount of at least 75 weight % or at least 85 weight %, and generally at no more than 95 weight %, based on the total weight of the aqueous pigment-based ink. Water is the predominant solvent in the "aqueous solvent medium", and water-miscible or immiscible organic solvents (other than the water-miscible humectants described above) are either absent or present in negligible amounts. For example, water can comprise at least 85 weight % of the total weight of all solvents in the aqueous solvent medium.

The pH of each aqueous pigment-based ink can be adjusted if desired to at least 7 and up to and including 12, or more likely to at least 8 and up to and including 10, or in some embodiments to at least 8 and up to and including 9.5. The pH can be achieved using any suitable base such as a hydroxide or an organic amine in a suitable amount. Buffers can be included to maintain the desired pH as would be readily apparent to one skilled in the art, according to Cols. 17-19 of U.S. Pat. No. 8,455,570 (noted above).

When the aqueous pigment-based ink is to be used in hardware with nickel or nickel-plated apparatus components, a corrosion inhibitor such as the sodium salt of 2- or 5-methyl-1-H-benzotriazole can be added, and the pH can be adjusted to at least 10 and up to and including 11. If printheads fashioned out of silicon are used for inkjet printing, the aqueous pigment-based ink pH can be adjusted to at least 7.5 and up to and including 10, or at least 8 and up to and including 9.5.

In some useful embodiments, two or more different aqueous pigment-based inks, as defined herein, can be used to provide colorful inkjet printed images or layers. Such two or more different aqueous pigment-based inks can be provided as part of an ink set as further defined herein.

In many continuous inkjet printing machines and system, an ink set can comprise at least one aqueous cyan pigment-based ink, at least one aqueous magenta pigment-based ink, at least one aqueous yellow pigment-based ink, and at least one aqueous black pigment-based ink, any and all of which can be aqueous anionically-stabilized pigment-based inks.

In some embodiments, an ink set according to this invention can further comprise a particle-free colorless inkjet composition (or aqueous particle-free fluid), for example as described in U.S. Pat. No. 8,764,161 (Cook et al.), the disclosure of which is incorporated herein by reference. Such compositions can be known as "fluids" in the art and can have various purposes or functions such as printhead maintenance, storage, flushing, or cleaning, or use as replenishment fluids. By "particle-free," it is meant that such compositions do not purposely contain particulates or pigments of any type, colorless or colored. Such particle-free fluids can also include any suitable biocide, anti-microbial agent, or antifungal agent. Water is the predominant solvent in such particle-free colorless inkjet compositions.

The durability, gloss, and other properties of an inkjet-printed image can be improved by the application of a colorless polymeric overcoat composition, which can be considered an aqueous particle-free inkjet composition and can be included as a component of an ink set, or provided separately. Examples of such colorless polymeric overcoat compositions are provided in U.S. Pat. No. 7,219,989 (Uerz et al.). In other to achieve high inkjet printing speeds and throughput associated with CIJ printing, such an overcoat composition can be applied using a CIJ printhead following in-line with one or more printheads of drop-forming nozzles dispensing "colored" aqueous inkjet ink compositions. Further details about such uses are provided in Col. 17 (lines 16-48) of U.S. Pat. No. 8,173,215 (Sowinski et al.).

Additional aqueous particle-free inkjet compositions (or inks) that can be included as a component of an ink set, or provided separately, include those compositions described in U.S. Pat. No. 10,189,271 (Lussier et al.) that can be inkjet printed to provide colorless or colored coatings, the disclosure of which publication is incorporated herein by reference. Such compositions can comprise at the least, one or more anionic polyether polyurethanes or anionic acrylic or styrene-acrylic polymers as described above, as well as a suitable antifoamant or defoamer to reduce foaming propensities. Such aqueous particle-free inkjet compositions can further comprise a suitable preservative, biocide, antifungal agent, or other antimicrobial agent.

Each component or composition present in an ink set, whether colored or colorless, may contain various other additives (such as preservatives, fragrances or masking fragrances, defoamers, surfactants, conductivity enhancing agents, drying agents, waterfastness agents, chelating agents, thickeners, anti-kogation agents, stabilizers, and buffering agents) that would be readily apparent to one skilled in the art.

Ink-Receptive Media

As shown in FIG. 1, a simple embodiment useful in the present invention is ink-receptive medium 10 having water-impermeable support 100 on which aqueous-based ink-receptive layer 110 is disposed, and water-impermeable support 100 and aqueous-based ink-receptive layer 110 are contiguous or in direct contact with each other. In general, water-impermeable support 100 can be opaque, semi-transparent, translucent, or transparent.

Suitable substrates for such media are typically planar in nature with two opposing surfaces or supporting sides one or both that can be inkjet printed to provide the same or different image. Substrates can have a single "layer" or stratum (such as a single support) or be composed of multiple layers or strata composed of the same or different materials. In most instances, a substrate is composed of a predominantly water-impermeable material, such as a plastic or polymeric material or a cellulosic material that is coated or laminated with one or more water-impermeable polymeric coatings.

Thus, useful substrate materials from which water-impermeable support 100 also can be constructed include but are not limited to, glossy, semi-glossy, or matte coated lithographic offset papers that typically comprise a paper base (support) that has been coated with a water-impermeable material to make the substrate water-impermeable, and that can have undergone a surface calendering treatment to provide a desired surface smoothness.

In many embodiments according to this invention, the substrate can have a hydrophobic outer surface prior to the aqueous-based ink-receptive layer being formed thereon. This hydrophobic outer surface can be substantially impermeable to water or to an aqueous pigment-based ink and difficult for an aqueous pigment-based ink to wet and adhere to. The effect of the aqueous-based ink-receptive layer in the substrate then is, firstly to provide a wettable surface for the aqueous pigment-based ink to contact and stick to upon impingement, thereby avoiding droplet splatter, repellency and wander, and then to spatially fix the a) pigment colorants (and any c) acidic polymers present) by complexation and coagulation with labile multivalent metal ions, which prevents image quality artifacts such as coalescence, mottle and intercolor bleeding.

Other useful substrates include water-impermeable materials such as resin-coated offset papers, biaxially oriented films including polyester films, polyethylene materials, polypropylene materials, polystyrene films, and polyamide films, and the metallized versions of these polymer films, melt-extrusion-coated papers, and laminated papers such as biaxially oriented support laminates such as those described in Col. 6 (line 50) to Col. 7 (line 2) of U.S. Pat. No. 9,067,448 (Dannhauser et al.), the disclosure of which is incorporated herein by reference.

The outer surface of a water-impermeable (hydrophobic) substrate can be modified or treated to increase the static surface energy to at least 45 dynes/cm, or at least 50 dynes/cm and up to and including 60 dynes/cm, in order to provide adequate wettability for formation of the aqueous-based ink-receptive layer. Static surface energy modification can be carried out using corona discharge treatment (CDT), plasma discharge treatment, flame ionization treatment, atomic layer deposition, or similar treatments known in the art. Such surface treatment can be carried out between steps of providing the substrate and depositing an aqueous composition (as described above).

Figure 2:
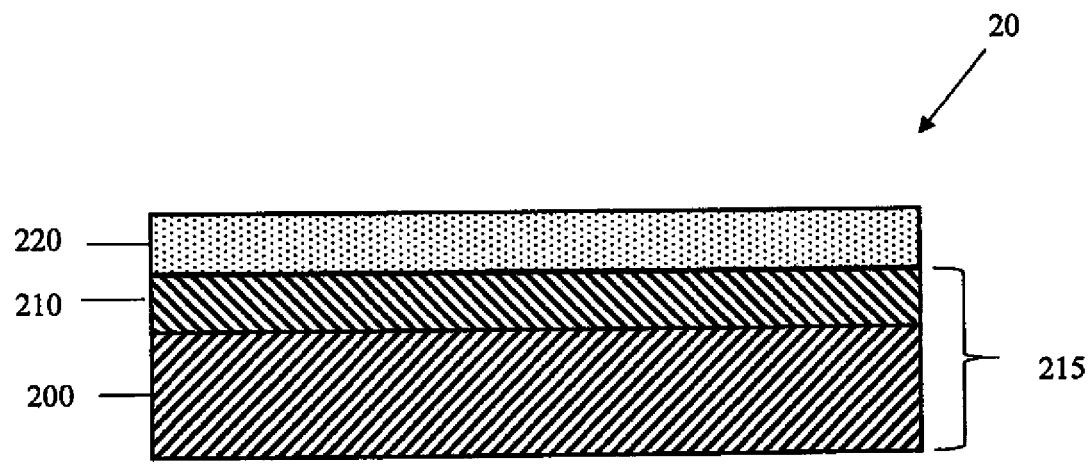
FIG. 2 shows a partial cross-sectional view of still another embodiment of an aqueous-based ink receiving medium used in the practice of the present invention comprising multiple layers.

FIG. 2 illustrates another embodiment that can be used in the practice of this invention in which ink-receptive medium 20 comprises water-impermeable support 200 and first layer 210 disposed on at least one surface of water-impermeable support 200, which together form water-impermeable substrate 215 for the ink-receptive medium according to the present invention. First layer 210 can comprise a water-based tie layer composition (described below) and can be located on at least one surface of water-impermeable support 200 and underneath aqueous-based ink-receptive layer 220. In many embodiments, water-impermeable support 200 can be composed of a water-impermeable material such as a polymeric film, or a co-extrudate or a laminate of two more polymeric films as referred to above in U.S. Pat. No. 9,067,448 (Cols. 6-7). Other useful materials for water-impermeable support 200 are also described above.

First layer 210 can be known in the art as a "tie-layer" and it is generally water-based (or aqueous-based) meaning that it is provided from an aqueous formulation and serves to improve the adhesion of aqueous-based ink-receptive layer 220 to water-impermeable support 200 when it is composed of one or more water-impermeable materials such as a polymeric film (such as a polyester film) or a polyethylene coated paper. Examples of hydrophilic materials useful for composing first layer 210 include but are not limited to, halogenated phenols, partially hydrolyzed vinyl chloride-vinyl acetate copolymers, vinylidene chloride-methyl acrylate-itaconic acid terpolymers, vinylidene chloride-acrylonitrile-itaconic acid terpolymers, and glycidyl (meth)acrylate polymers. Other useful materials include any polymers, copolymers, reactive polymers and copolymers, and mixtures thereof, that exhibit effective bonding between the topcoat layer and the substrate. Water-soluble or water-dispersible polymers can also be used including but not limited to, poly(vinyl alcohol)s, polyvinyl amine, poly(vinyl pyrrolidone), gelatin and gelatin derivatives, cellulose ethers, poly(oxazoline), poly(vinyl acetamide), partially hydrolyzed poly(vinyl acetate/polyvinyl alcohol), poly (acrylic acid), poly(acrylamide), poly(alkylene oxide)s, sulfonated or phosphonated polyesters or polystyrenes, casein, zein, albumin, chitin, chitosan, dextran, pectin, a collagen derivative, collodion, agar-agar, arrowroot, guar, carrageenan, tragacanth, xanthan, rhamsan, and various polymeric lattices. Particularly useful first layer materials include polyvinyl alcohols, polyvinyl amines, gelatin and gelatin derivatives, poly(ethyleneimine), epoxy resins, polyurethanes, polyacrylamides and derivatives or copolymers thereof, and mixtures of any of these materials.

While first layer 210 can be a single discrete layer, it can also comprise two or more water-based (aqueous-based) sub-layers, each of which comprises the same or different hydrophilic materials described above. For example, first layer 210 can be composed of a first sub-layer and a second sub-layer, wherein the first sub-layer comprises poly(ethyleneimine) and an epoxy resin modified with an acidified aminoethylated vinyl polymer, and the second sub-layer that is disposed on the first sub-layer comprises a crosslinked polyvinyl alcohol.

The total dry coverage of the one or more hydrophilic materials in first layer 210 (or a tie-layer), whether comprised of a single discrete layer or multiple sub-layers, can be at least 0.05 g/m$^2$ and up to and including 12 g/m$^2$, or at least 0.05 g/m$^2$ and up to and including 1.5 g/m$^2$.

Further details about first layer 210 (or tie-layer) construction and materials are provided in U.S. Pat. No. 9,376,582 (noted above), the disclosure of which is incorporated herein by reference.

However, one advantage of the present invention is that such first layers can be omitted if desired and lamination bond strength between an inkjet-printed image of deposited aqueous pigment-based inks and a flexible polymeric film or paper (described below) is not diminished.

For the ink-receptive media useful in the present invention, the aqueous-based ink-receptive layer, upon drying, generally has a dry coating weight of at least 0.1 $g/m^2$ or at least 0.3 $g/m^2$ and up to and including 3 $g/m^2$, or up to and including 5 $g/m^2$ or up to and including 10 $g/m^2$. Such aqueous-based ink-receptive layer comprises the components (a), (b) and optionally components (c) and (d) as described above, in the described dry coverage amounts.

Once the aqueous composition is applied to a substrate, it can be dried to form an ink-receptive medium having an aqueous-based ink-receptive layer, which has various uses. For example, such articles are particularly useful in inkjet printing methods to provide a monochrome or multi-color image or layer on the aqueous-based ink-receptive layer using one or more different aqueous pigment-based inks (as defined above), followed by drying of all applied materials, to remove substantially all solvent medium including water. A functional layer (described below) can be formed on the deposited a) one or more pigment colorants (such as anionically-stabilized pigment colorants) as described in more detail below. Details of such processes for making the ink-receptive media and inkjet-printed articles are also provided below.

Method for Making Ink-Receptive Media

An aqueous composition (as described above) can be used to prepare or form an aqueous-based ink-receptive layer on one or both opposing sides (or surfaces) of a substrate (as described above). Thus, a substrate, particularly a water-impermeable substrate, can be chosen and an aqueous composition can be disposed on at least one surface of the substrate to provide an aqueous-based ink-receptive layer.

The method procedures and apparatus used to accomplish this can be selected from various known coating techniques, including but not limited to spraying, rod coating, blade coating, gravure coating, (direct, reverse, or offset), flexographic coating, size press (puddle and metered) coating, extrusion hopper coating, and curtain coating, using suitable equipment known for these purposes. After drying using suitable drying conditions and equipment, inkjet printing can be carried out on the resulting aqueous-based ink-receptive layer.

In some embodiments, an aqueous-based ink-receptive layer can be formed "in-line" as part of a substrate manufacturing process (such as a film making process). Alternatively, the aqueous-based ink-receptive layer can be formed in a separate coating step after the manufacture of a water-impermeable substrate. Moreover, the aqueous-based ink-receptive layer can be formed in-line as part of an inkjet printing operation (such as a CIJ printing operation), wherein the aqueous composition is applied to a substrate in a "pre-coating" or "pre-treatment" station prior to inkjet printing of one or more aqueous pigment-based inks. Such pre-coating operations can be designed to provide uniform coating coverage, or in some instances, only a specific area of the substrate can be provided with the aqueous composition. While the applied aqueous composition can be dried completely before inkjet printing, complete drying may not be necessary at that time and overall drying of both applied aqueous-based ink-receptive layer and deposited a) one or more pigment colorants in the deposited aqueous pigment-based inks in an image can be carried out at the same time using suitable conditions and equipment that are known in the art.

If an ink-receptive medium is prepared with a first layer or multiple sub-layers, as described above, such first layer or multiple sub-layers can be formed using techniques and equipment described above for forming an aqueous-based ink-receptive layer. For example, the first layer and aqueous-based ink-receptive layer can be separately formed on a support to form a substrate in distinct or separate coating operations with an intermediate drying operation. Alternatively, the first layer can be formed in-line as part of an ink-receptive media manufacturing or an inkjet printing operation so that multiple layers are formed or applied sequentially with or without drying between layer applications. Further details of such processes are provided in Cols. 7-8 of U.S. Pat. No. 9,376,582 (noted above). The formation of multiple layers in ink-receptive media is particularly desirable using slide-hopper and curtain coating techniques.

Method and Apparatus for Inkjet Printing

Ink-receptive media prepared as described above can be inkjet printed by depositing directly onto the outer surface of the aqueous-based ink-receptive layer, one or more aqueous pigment-based inks comprising a) one or more pigment colorants and b) one or more water-miscible humectants (as described above) to provide an inkjet-printed pattern or image of one or more deposited aqueous pigment-based inks. Such aqueous pigment-based-inks can be aqueous anionically-stabilized pigment-based inks. The aqueous pigment-based inks can be printed onto the resulting water-impermeable substrates as described above, especially to provide plastic packaging materials such as laminated plastic wrap (that is, flexible inkjet-printed articles as described below) and other materials that would be readily apparent to one skilled in the art.

While the aqueous compositions and aqueous pigment-based inks described herein can be useful in drop-on-demand (DOD) printing systems, the advantages of the present invention are particularly evident when the present invention is carried out using continuous inkjet (CIJ) printing processes, equipment, and systems. There are several CIJ printing processes known in the art, and the present invention is not limited to a particular CIJ process, but there may be certain CIJ processes that are more useful than others. In general, such CIJ processes use one or more aqueous pigment-based inks that are held in individual main fluid supplies and ejected through one or more printheads (containing nozzles) such as full-width printheads. Unprinted aqueous pigment-based ink(s) can be collected and recycled through the printing system multiple times until it (they) is (are) used up. In addition, the CIJ printing system can have incorporated replenisher systems. Details of such CIJ processes, equipment, and systems are provided for example in U.S. Pat. No. 8,173,215 (Sowinski et al.), U.S. Pat. No. 8,991,986 B2 (Sowinski et al.), and U.S. Pat. No. 9,010,909 B2 (Nelson et al.), the disclosures of which are incorporated herein by reference.

Thus, in most CIJ inkjet printing processes, each aqueous pigment-based ink can be ejected or printed from a respective main fluid supply dedicated to a particular aqueous pigment-based ink only, as a continuous stream that is broken into both printing drops and non-printing drops using a drop generator of a suitable design. The non-printing drops of the respective continuous streams of aqueous pigment-based inks can be collected using suitable collecting means such as a "catcher" and returned to the respective main fluid supplies. Each of the non-printed aqueous pigment-based inks (for example, aqueous anionically-stabilized pigment-based inks) can be continuously recirculated between the respective main fluid supplies and a drop generator as long as necessary. This entire scenario can be carried out using a single (first) aqueous pigment-based ink alone, or in combination with one or more additional aqueous pigment-based inks having the same or different "colors" or hues as the first aqueous pigment-based ink. The multiple aqueous pigment-based inks can be then inkjet printed in a chosen sequence that can be controlled by software and digital input, in a controlled manner, to provide a multicolor inkjet printed image on the surface of the ink receiving medium. For example, in some CIJ printing systems, one or more different aqueous pigment-based inks can be deposited in response to electrical signals governed by digital input.

The printing methods according to the present invention can be carried out using a continuous high-speed commercial inkjet printer, for example in which the inkjet printer forms colored images using one or more different printheads such as full-width printheads with respect to the ink-receptive media, in sequence, in which the different colored parts of images are to be registered. One type of continuous inkjet (CIJ) printing, commonly referred to as "continuous stream," uses a pressurized ink source that produces a continuous stream of printing drops (droplets) from a main fluid supply for each aqueous pigment-based ink, or a continuous stream that is broken into both printing drops and non-printing drops. Continuous inkjet printers can utilize electrostatic charging devices as drop generators that are placed close to the point where a filament of working inkjet composition breaks into individual drops that are electrically charged and then directed to an appropriate location by deflection electrodes having a large potential difference. Where no color image is desired, the non-printing drops can be deflected into an ink-capturing mechanism and disposed of or recycled by returning them to the original main fluid supply. When a printed color image is desired, the printing drops are not deflected but are allowed to strike the topcoat layer of the ink-receptive medium in designated locations. Alternatively, deflected printing droplets for each or all inks can be allowed to strike the outermost surface of the inkjet receiver medium while non-deflected non-printing drops can be collected and returned to the main fluid supply.

CIJ printing systems are generally comprised of two main equipment components, a fluid system (including one or more ink reservoirs or main fluid supplies) and one or more printheads. Each aqueous pigment-based ink can be pumped through a supply line from its main fluid supply to a manifold that distributes the ink to a plurality of orifices of printheads, typically arranged in linear array(s), under sufficient pressure to cause ink streams to issue from the orifices of the printhead(s). As noted above, stimulations can be applied to the printhead(s) to cause those ink streams to form streams of uniformly sized and spaced drops that are deflected in a suitable manner, into printing or non-printing paths. This discrimination can also be accomplished when the printhead digitally creates large and small drops. In some embodiments, small drops are deflected by an air current and returned to the main fluid supply; and large drops, being less affected by the air current, are printed onto the ink-receptive medium. In other embodiments, large drops are deflected in a designed manner and small drops are printed.

In addition, it may be useful to apply an aqueous colorless or aqueous particle-free ink composition or fluid to a pattern or image of one or more deposited aqueous pigment-based inks. This operation can be carried out simultaneously or sequentially with inkjet printing of the "colored" aqueous pigment-based ink(s). For example, according to U.S. Pat. No. 10,189,271 (Lussier et al.), a colorless lacquer or ink composition can be applied over single- or multi-color inkjet-printed image.

Useful CIJ printing processes and equipment can include replenishment systems that measure ink electrical resistivity and are described for example in U.S. Pat. No. 5,526,026 (Bowers), the disclosure of which is incorporated herein by reference and in EP 0597628B1 (Loyd et al.). Useful CIJ printing processes and equipment that employ other means for aqueous pigment-based ink concentration sensing are disclosed in U.S. Pat. No. 7,221,440 (McCann et al.), the disclosure of which is incorporated herein by reference, and in EP 0571784B1 (McCann et al.) and EP 1,013,450B1 (Woolard et al.).

In some embodiments, basic ink replenishment can be carried out using a fluid system containing an ink resistivity measurement cell through which an aqueous pigment-based ink passes as it is being recirculated through the ink handling portion of the system, including the printhead. A calculation means determines the resistance of the ink resistivity cell. A logic and control unit, responsive to the calculation means, controls the transfer of aqueous pigment-based ink from a supplemental "ink" supply and the transfer of an aqueous particle-free fluid ("carrier fluid") from a replenishment carrier fluid supply to the system main fluid supply, to maintain desired resistivity in the aqueous pigment-based ink. The volume of each aqueous pigment-based ink is monitored by a float valve position, and when a predetermined volume has been depleted, the predetermined volume is replaced by either aqueous pigment-based ink from the supplemental ink supply or by carrier fluid from the replenishment carrier fluid supply. Thus, the first and any additional aqueous pigment-based inks can be replenished, respectively, with respective aqueous pigment-based inks.

In other examples, the method according to the present invention can further comprise replenishing a main fluid supply with an aqueous particle-free fluid that has a dynamic viscosity of less than or equal to 5 centipoise (5 mPa-sec) at 25° C. as measured using a rolling ball viscometer.

In some embodiments, the method according to the present invention is carried out using a CIJ printing system utilizing a plurality of printing drops formed from a continuous fluid stream, and non-printing drops of a different volume than the printing drops are diverted by a drop deflection means into a "gutter" for collection and recirculation. Details about such CIJ printing systems and equipment are provided for example in U.S. Pat. No. 6,588,888 (Jeanmaire et al.), U.S. Pat. No. 6,554,410 (Jeanmaire et al.), U.S. Pat. No. 6,682,182 (Jeanmaire et al.), U.S. Pat. No. 6,793,328 (Jeanmaire et al.), U.S. Pat. No. 6,866,370 (Jeanmaire et al.), U.S. Pat. No. 6,575,566 (Jeanmaire et al.), and U.S. Pat. No. 6,517,197 (Hawkins et al.), and in U.S. Patent Application Publications 2002/0202054 (Jeanmaire et al.), the disclosures of all of which are incorporated herein by reference.

In other embodiments, an aqueous pigment-based ink can be printed using an apparatus capable of controlling the direction of the formed printing drops and non-printing drops by asymmetric application of heat to the fluid stream that initializes drop breakup and serves to steer the resultant drop as described for example in U.S. Pat. No. 6,079,821 (Chwalek et al.) and U.S. Pat. No. 6,505,921 (Chwalek), the disclosure of both of which are incorporated herein by reference. Useful agitation, heated supply, printhead, and fluid filtration means for CIJ printing are described for example in U.S. Pat. No. 6,817,705 (Crockett et al.), the disclosure of which is incorporated herein by reference.

A simple schematic of a useful CIJ printing system is also shown in FIG. 1 of U.S. Pat. No. 8,764,161 (Cook et al.), the disclosure of which is incorporated herein by reference.

Inkjet-Printed Articles

Inkjet-printed articles prepared according to the present invention comprise a substrate particularly those composed of a water-impermeable material (as described above) in which an aqueous-based ink-receptive layer had been formed (as described above), and on which an inkjet-printed image has been formed by inkjet printing. As noted above, such inkjet-printed image can be monochrome (single color) or multi-color or even colorless, or a colorless image or layer can be formed over a monochrome or multi-color inkjet-printed image.

In the inkjet-printed image, each of the one or more a) pigment colorants (such as anionically-stabilized pigment colorants) can be present in an amount of at least 40 weight % and up to and including 60 weight %, based on the total weight of the inkjet printed image, where most of the remaining deposited weight is comprised of one or more c) acidic polymers. Such inkjet-printed images can contain small amounts of residual b) one or more humectants as such compounds are generally chosen so that most of them are evaporated during drying stages of inkjet printing.

For example, the inkjet-printed image can be formed by depositing directly onto the outer surface of the aqueous-based ink-receptive layer, two or more aqueous pigment-based inks, defined as follows, to provide an inkjet-printed image comprising two or more deposited anionically-stabilized pigment colorants, each of the two or more aqueous pigment-based inks comprising:

a) one or more anionically-stabilized pigment colorants defined as follows, wherein 50% of the volume of each is provided by pigment colorant particles having a diameter of less than 100 nm, and 95% of the volume of each is provided by pigment colorant particles having a diameter of less than 150 nm, said particle size diameters being measured using a dynamic light scattering particle sizing instrument;

b) one or more water-miscible humectants defined as follows; and c) an acidic polymer that is an anionic polyurethane, an acidic acrylic polymer, an acidic styrene-acrylic polymer, or any combination of these materials, each acidic polymer having an acid number of at least 50 and up to and including 240, each acidic polymer being neutralized with sufficient base to render it dispersible or soluble in each aqueous pigment-based ink, wherein the two or more aqueous pigment-based inks are selected from the following:

an aqueous cyan pigment-based ink that comprises one or more anionically-stabilized cyan pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %;

an aqueous magenta pigment-based ink that comprises one or more anionically-stabilized magenta pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %;

an aqueous yellow pigment-based ink that comprises one or more anionically-stabilized yellow pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %; and an aqueous black pigment-based ink that comprises one or more anionically-stabilized black pigment colorants, and the b) one or more water-miscible humectants consists essentially of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 5 weight % and up to and including 10 weight %, all amounts being based on the total weight of the respective aqueous pigment-based ink.

The combination of anionically-stabilized pigment colorants in such inkjet printed images can be, after drying, at least 40 weight % and up to and including 60 weight %, based on the total weight of the inkjet-printed image.

Figure 3:
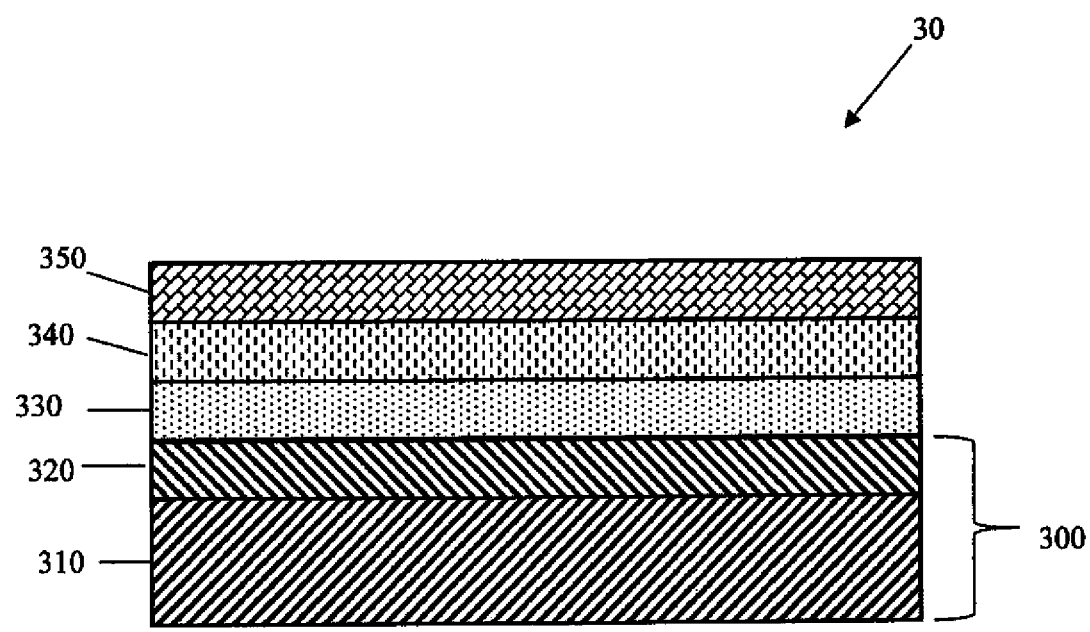
FIG. 3 shows a partial cross-sectional view of one embodiment of an inkjet-printed article according to the present invention.

In some embodiments for example, as illustrated in FIG. 3, inkjet-printed article 30 can comprise water-impermeable substrate 300 that is composed of water-impermeable support 310 and first layer 320 disposed thereon; aqueous-based ink-receptive layer 330 disposed on first layer 320; inkjet-printed image 340 disposed on aqueous-based ink-receptive layer 330, and functional layer 350 disposed on inkjet-printed image 340, which functional layer 350 can be a white opacifying layer, a transparent (or clear) protective layer, or an adhesive layer comprising an adhesive that can have a protective layer adhered thereto.

For example, a white opaque layer can be present as a functional layer to provide desired opacity to the resulting inkjet-printed article, particularly when the water-impermeable substrate is transparent or translucent. Any known opaque, aqueous-based opacifying layer composition can be used to form such functional layers including but not limited to, aqueous-based white flexographic ink compositions sold as Bianco Base 100 by Sun Chemical Corporation and Flint Group Water HMJ 90104. Any commercially available aqueous-based latex ink can be used to provide a white opaque layer, including for example WB MSQUARED™ DPQ-173 or AQUALAM™ 18350 aqueous-based white ink from Sun Chemical Corporation, which aqueous-based white ink comprises a polyurethane latex binder.

A transparent (or clear) protective layer can be used as a functional layer to protect the inkjet-printed article against environmental and physical damage and stress, provide abrasion resistance, resistance to fingerprints, and delamination resistance (especially if it has multiple properties). Such transparent protective layers and compositions used to prepare them are described in U.S. Patent Application Publication 2018/0051184 (noted above). In addition, known aqueous-based overprint varnishes such as DBP-1555 (Sun Chemical), Haut Brilliant 17-604327-7 (Siegwerk) and Micheal Huber Munchen 877801 Varnish Anticurling can be used.

An adhesive layer can be provided as a functional layer comprising an adhesion especially in articles used as flexible laminated packaging (for example, flexible inkjet-printed articles described below) wherein it is desired to bond a separate water-impermeable film to an inkjet-printed article. Classes of useful adhesives include aqueous-based, solventless, and solvent-based adhesives. Useful examples of aqueous-based adhesives used in such adhesive layers include but are not limited to, Dow Chemical ROBOND™ acrylic adhesives L90M, L148, and L330 that can be used in combination with a crosslinking agent such as Dow Chemical CR 9-101. Representative polyurethane aqueous-based adhesives are AQUALAM™ polyurethane aqueous-based adhesives from Dow Chemical that can be used in combination with the Dow Chemical CR 7-103 crosslinking agent, and POLURFLEX 8414/7019 (Sapici, Italy).

Useful examples of solvent-based adhesives used in such adhesive layers include but are not limited to, two component polyurethane systems from Dow Chemical (ADCOTE 577/CR 87-124 or L 719A/CR 719C) or Sapici (3714/6846).

Solvent-less adhesive are advantageous in that they are 100% solids and do not require drying of the adhesive after application to an inkjet-printed image. Lower adhesive raw material costs and adhesive laydowns also result in significant cost savings over solvent-based or water-based adhesives. Useful examples of solvent-less adhesives used in such adhesive layers include but are not limited to, two component polyurethane systems from Dow Chemical (MOR-FREE L75-164/C-411) or Sapici (7858/6076).

Although functional layers with individual functions are described separately above, it is also possible to combine two or more functions (for example, opacity and adhesion) into a single functional layer. Such combinations are described for example in Col. 18 (lines 24-37) of U.S. Pat. No. 9,376,582 (noted above). In addition, the functional layer descriptions here are intended to be illustrative and not limiting as other functional layers are possible as would be readily apparent to one skilled in the art.

As shown in FIG. 3, when functional layer 350 is aqueous-based (supplied out of an aqueous formulation), it can be applied or formed using any of the methods described above for applying or forming first layer 320 and aqueous-based ink-receptive layer 330, including known coating and digital deposition processes. For example, functional layer 350 can be applied as a flood coating across the entire surface of the inkjet-printed article, or it can be applied in a pattern-wise or image-wise fashion using any suitable pattern-forming means such as flexographic or gravure means. If functional layer 350 is solvent-free, it can be applied using a melt extrusion process wherein the molten or viscous solventless composition is extruded as a continuous layer over the surface of the dried aqueous-based inkjet printed image 340. Following melt-extrusion, functional layer 350 can be further processed using heat and pressure to improve adhesion, followed by cooling. In some embodiments, a solventless composition can be a two-part reactive composition intended to serve as an adhesive to which a continuous transparent protective functional layer is laminated using heat or pressure.

In some other embodiments, the inkjet-printed article according to the present invention is simpler in structure (not shown) compared to that illustrated in FIG. 3. In such embodiments, aqueous-based inkjet-printed image 340 is disposed directly on the aqueous-based ink-receptive layer 330. Thus, first layer 320 is omitted in such embodiments. Functional layer 350 can be present or omitted from such embodiments.

Other useful embodiments of ink-receptive media and resulting inkjet-printed articles, with various layer constructions, can be conceived of and prepared by a skilled artisan using the teaching provided herein.

Flexible Inkjet-Printed Articles and Method for Preparing them

The inkjet-printed articles prepared according to the present invention as described above, can be used to provide "flexible inkjet-printed articles" that comprise laminated multilayer structures that tend to be flexible and desirably transparent (except for any inkjet-printed image).

Figure 4:
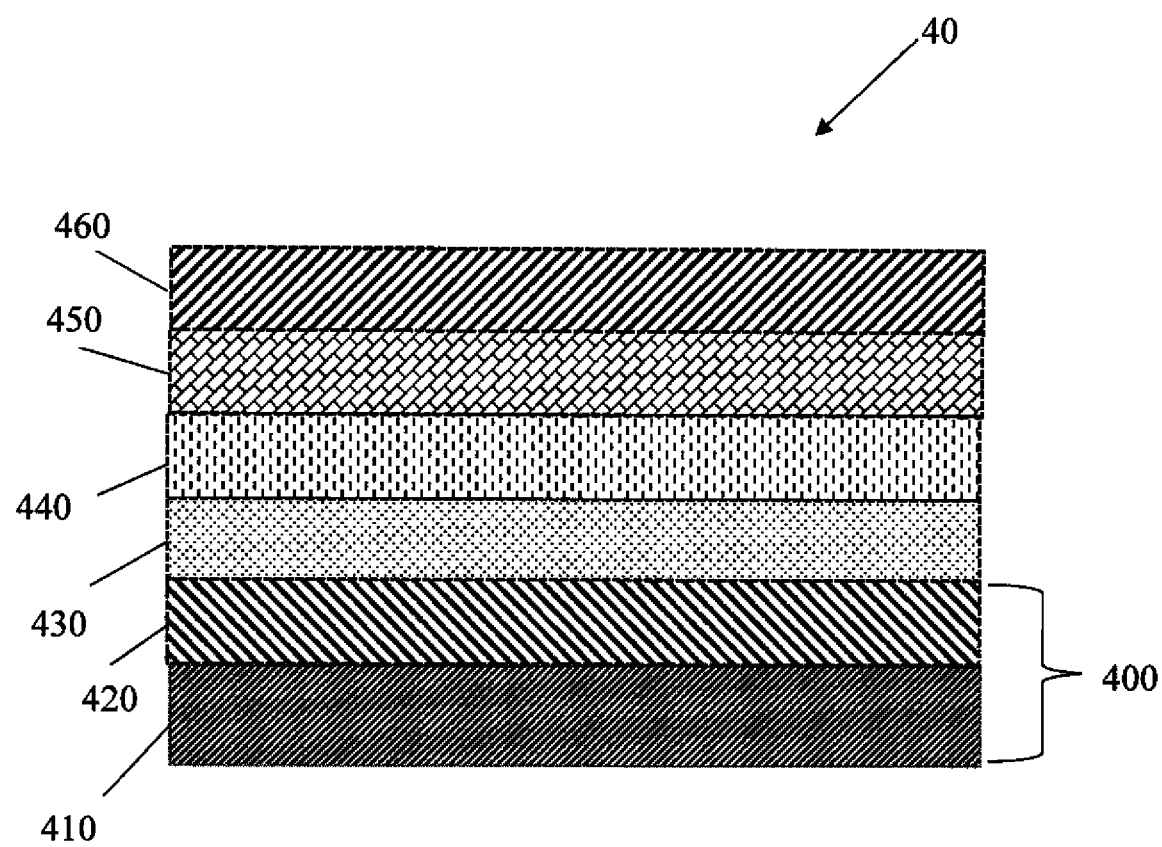
FIG. 4 shows a partial cross-sectional view of one embodiment of a flexible inkjet-printed article according to the present invention.

FIG. 4 illustrates one such embodiment, showing flexible inkjet-printed article 40 that comprises water-impermeable substrate 400 that is composed of water-impermeable support 410 and first layer 420 disposed thereon; aqueous-based ink-receptive layer 430 disposed on first layer 420; inkjet-printed image 440 disposed on aqueous-based ink-receptive layer 430, and functional layer 450 disposed on inkjet-printed image 440, which functional layer 450 can comprise an adhesive material, or provide other "functional" properties (such as opacity or protective features) as described above.

Laminated to functional layer 450 is flexible polymeric film or paper 460 that can be comprised of one or more materials that are generally flexible and in many instances, can be opaque, transparent, or metallized, and can be water-impermeable as in the case of water-impermeable polymeric films that can be composed of a polyester, polyimide, polycarbonate, polystyrene, polyolefin such as oriented polypropylene or polyethylene, polyurethane, polyvinyl chloride, polyvinylidene chloride, or a mixture of two or more of these materials or a laminate of two or more layers of such materials.

Inkjet-printed article 40 can be used as flexible packaging materials or multi-layer labels. Laminated flexible polymeric film or paper 460 can be transparent (clear) or opaque, and can be metallized with imbedded metal particles or flakes or have a metal foil in its structure, such as metallized polymeric films. It is particularly useful that functional layer 450 be a white opaque or transparent protective layer arranged between flexible polymeric film or paper 460 and inkjet-printed image 440.

Useful adhesive materials in an adhesive composition to enable the formation of a flexible inkjet printed article include but are not limited to, water-based polyurethane resins and other materials described above for the functional layer. Both solvent-based and water-based adhesives can be used and such materials would be readily apparent to those skilled in the flexible packaging art. Useful adhesive materials can be opaque or clear (transparent) when dried. For example, useful solvent-based adhesives used in solvent-based lamination procedures include but are not limited to, solvent-based polyurethane resins. Moreover, water-based adhesives useful in water-based lamination procedures include but are not limited to water-based polyurethane resins. Solventless polyurethane resins can also be used.

It is desirable that flexible polymeric film or paper 460 is adhered to functional layer 450 to provide a lamination bond strength greater than 1.0 N/cm as measured for example, an MTS SINTECH® 1/G Electromechanical Testing System as described in further detail below in the working examples.

The present invention also provides flexible inkjet-printed articles similar to that shown in FIG. 4, but from which first layer 420 is omitted, so that substrate 400 consists only of water-impermeable support 410.

While the adhesive material can be incorporated into functional layer 450, an adhesive material can be provided separately or additionally on flexible polymeric film or paper 460. In such embodiments, it is also possible to omit functional layer 450 or to use it for functions other than adhesive purposes.

As a skilled worker would appreciate from the foregoing discussion, such flexible inkjet-printed articles can be prepared by, in order:

A) providing a suitable substrate as described above, such as a water-impermeable substrate;

A') forming an aqueous-based ink-receptive layer thereon using any suitable aqueous composition and means as described above;

B) depositing directly on an outer surface of the aqueous-based ink-receptive layer, one or more aqueous pigment-based inks to provide an inkjet-printed image of one or more deposited aqueous pigment-based inks, all of which are described above;

C) drying the one or more deposited aqueous pigment-based inks to remove substantially all water (and other solvents) and low boiling b) one or more water-miscible humectants from them (as well as from the aqueous composition if present) using any suitable drying means and conditions as would be readily apparent to one skilled in the art, to form an inkjet-printed image;

D) forming a functional layer comprising an adhesive composition on the inkjet-printed image, and which functional layer can provide multiple functions as described above; and E) adhering a flexible polymeric film or paper to the functional layer, to form a flexible printed article.

The present invention provides at least the following embodiments and combinations thereof, but other combinations of features are considered to be within the present invention as a skilled artisan would appreciate from the teaching of this disclosure:

1. A method for inkjet printing, comprising, in order:

A') providing an ink receptive medium comprising a substrate and an aqueous-based ink-receptive layer disposed thereon, which aqueous-based ink-receptive layer has an outer surface, and comprises:
(a) one or more water-soluble salts of a multivalent metal cation in an amount of at least 0.6 weight % and up to and including 49 weight %;
(b) one or both of a polyvinyl alcohol and a polyvinyl amine, or a copolymer derived from a vinyl alcohol and a vinyl amine, in a total amount of at least 0.5 weight % and up to and including 30 weight %;
optionally, (c) a crosslinking agent in an amount of at least 0.01 weight % and up to and including 5 weight %; and
optionally, (d) silica particles in an amount of up to and including 30 weight %,
all amounts (a), (b), (c), and (d) being based on the total weight of the aqueous-based ink-receptive layer; and B) depositing directly onto the outer surface of the aqueous-based ink-receptive layer, one or more aqueous pigment-based inks to provide an image of one or more deposited anionically-stabilized pigment colorants, each aqueous pigment-based ink having at least 75 weight % and up to and including 95 weight % of water, and comprising:

a) one or more anionically-stabilized pigment colorants;
b) one or more water-miscible humectants that are present in a total amount of at least 1 weight % and up to and including 20 weight %, and consist essentially of compounds, each of which has a carbon atom to oxygen atom ratio of at least 1.0:1.0 and only two hydroxy groups; and
optionally,
c) an acidic polymer that is an anionic polyurethane, an acidic acrylic polymer, an acidic styrene-acrylic polymer, or any combination of these materials, each acidic polymer having an acid number of at least 50 and up to and including 240, and each acidic polymer being neutralized with sufficient base to render it dispersible or soluble in each aqueous pigment-based ink, wherein the weight % amounts of water and of the b) water-miscible humectants are based on the total weight of each aqueous pigment-based ink.

2. The method of embodiment 1, further comprising:

D) forming a functional layer on the image of one or more deposited anionically-stabilized pigment colorants.

3. A method for inkjet printing, comprising, in order:

A) providing a substrate;

A') depositing an aqueous-based ink-receptive layer composition on an outer surface of the substrate to form an aqueous-based ink-receptive layer on the outer surface of the substrate, thereby forming an ink receptive medium, wherein the aqueous-based ink-receptive layer has an outer surface, and comprises:
(a) one or more water-soluble salts of a multivalent metal cation in an amount of at least 0.6 weight % and up to and including 49 weight %;
(b) one or more of a polyvinyl alcohol and a polyvinyl amine, or a copolymer derived from a vinyl alcohol and a vinyl amine, in a total amount of at least 0.5 weight % and up to and including 30 weight %;
optionally, (c) a crosslinking agent in an amount of at least 0.01 weight % and up to and including 5 weight %; and
optionally, (d) silica particles in an amount of up to and including 30 weight %,
all amounts (a), (b), (c), and (d) being based on the total weight of the aqueous-based ink-receptive layer;

B) depositing directly on the outer surface of the aqueous-based ink-receptive layer, one or more aqueous pigment-based inks to provide an image of one or more deposited anionically-stabilized pigment colorants, each aqueous pigment-based ink having at least 75 weight % and up to and including 95 weight % of water, and comprising:

a) one or more anionically-stabilized pigment colorants;
b) one or more water-miscible humectants in a total amount of at least 1 weight % and up to and including 20 weight %, and consisting essentially of compounds, each of which has a carbon atom to oxygen atom ratio of at least 1.0:1.0 and only two hydroxy groups; and
optionally,
c) an acidic polymer that is an anionic polyurethane, an acidic acrylic polymer, an acidic styrene-acrylic polymer, or any combination of these materials, each acidic polymer having an acid number of at least 50 and up to and including 240, and each acidic polymer being neutralized with sufficient bases to render it dispersible or soluble in each aqueous anionically-stabilized pigment-based ink, wherein the weight % amounts of water and the b) water-miscible humectants are based on the total weight of each aqueous pigment-based ink;

and optionally,

D) forming a functional layer on the one or more deposited anionically-stabilized pigment colorants.

4. The method of embodiment 3, further comprising between steps A) and A'):

surface treating the substrate to increase its surface energy to at least 45 dyne/cm.

5. The method of any of embodiments 2 to 4, wherein the formed functional layer is a white opacifying layer.

6. The method of any of embodiments 2 to 4, wherein the formed functional layer is a transparent protective layer.

7. The method of any of embodiments 1 to 6, wherein the formed functional layer comprises an adhesive material.

8. A method for inkjet printing, comprising, in order:

A') providing an ink receptive medium comprising a water-impermeable substrate and an aqueous-based ink-receptive layer disposed thereon, which aqueous-based ink-receptive layer has an outer surface, and comprises:

(a) one or more water-soluble salts of a multivalent metal cation in an amount of at least 1 weight % and up to and including 24 weight %;

(b) one or both of a polyvinyl alcohol and a polyvinyl amine, or a copolymer derived from a vinyl alcohol and a vinyl amine, in a total amount of at least 1 weight % and up to and including 20 weight %;

(c) a crosslinking agent in an amount of at least 0.1 weight % and up to and including 2 weight %; and (d) silica particles in an amount of up to and including 10 weight %, all amounts (a), (b), (c), and (d) being based on the total weight of the aqueous-based ink-receptive layer; and B) depositing directly onto the outer surface of the aqueous-based ink-receptive layer, two or more aqueous pigment-based inks, defined as follows, to provide an inkjet-printed image comprising two or more deposited anionically-stabilized pigment colorants, each of the two or more aqueous pigment-based inks comprising:

a) one or more anionically-stabilized pigment colorants defined as follows, wherein 50% of the volume of each the a) one or more anionically-stabilized pigment colorants is provided by pigment colorant particles having a diameter of less than 100 nm, and 95% of the volume of each of the a) one or more anionically-stabilized pigment colorants is provided by pigment colorant particles having a diameter of less than 150 nm, the particle size diameters being measured using a dynamic light scattering particle sizing instrument;

b) one or more water-miscible humectants defined as follows; and c) an acidic polymer that is an anionic polyurethane, an acidic acrylic polymer, an acidic styrene-acrylic polymer, or any combination of these materials, each acidic polymer having an acid number of at least 50 and up to and including 240, each acidic polymer being neutralized with sufficient base to render it dispersible or soluble in each aqueous pigment-based ink, wherein the two or more aqueous pigment-based inks are selected from the following:

an aqueous cyan pigment-based ink that comprises one or more anionically-stabilized cyan pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %;

an aqueous magenta pigment-based ink that comprises one or more anionically-stabilized magenta pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %;

an aqueous yellow pigment-based ink that comprises one or more anionically-stabilized yellow pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %; and an aqueous black pigment-based ink that comprises one or more anionically-stabilized black pigment colorants, and the b) one or more water-miscible humectants consists essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 5 weight % and up to and including 10 weight %, all amounts being based on the total weight of the respective aqueous pigment-based ink.

9. The method of embodiment 8, wherein the water-impermeable substrate comprises a polymeric film.

10. The method of any of embodiments 1 to 9, wherein the aqueous-based ink-receptive layer is present on the water-impermeable substrate at a dry coverage of at least 0.5 g/m$^2$ and up to and including 2 g/m$^2$.

11. The method of any of embodiments 1 to 10, wherein the b) one or more water-miscible humectants consist essentially of compounds, each of which has a carbon atom to oxygen atom ratio of at least 1.0:1.0 and up to and including 2.7:1.0.

12. The method of any of embodiments 1 to 11, wherein the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds.

13. The method of any of embodiments 1 to 12, wherein the b) one or more water-miscible humectants are present independently in each of the one or more aqueous pigment-based inks in a total amount of at least 3 weight % and up to and including 10 weight %, based on the total weight of each aqueous pigment-based inks.

14. The method of any of embodiments 1 to 13, wherein the a) one or more anionically-stabilized pigment colorants comprises an anionically-stabilized cyan pigment, an anionically-stabilized magenta pigment, an anionically-stabilized yellow pigment, an anionically-stabilized black pigment, an anionically-stabilized green pigment, an anionically-stabilized orange pigment, an anionically-stabilized white pigment, an anionically-stabilized red pigment, an anionically-stabilized blue pigment, or an anionically-stabilized violet pigment, or a combination of two or more of such anionically-stabilized pigments, and the total amount of a) anionically-stabilized pigment colorants independently present in each of the one or more different aqueous pigment-based inks is at least 0.1 weight % and up to and including 25 weight %, based on the total weight of each aqueous pigment-based ink.

15. The method of any of embodiments 1 to 14, wherein 50% of the volume of each of the a) one or more pigment colorants in each aqueous pigment-based ink is provided by pigment colorant particles having a diameter of less than 100 nm, and 95% of the volume of each of the a) one or more pigment colorants is provided by pigment colorant particles having a diameter of less than 150 nm, the particle size diameters being measured using a dynamic light scattering particle sizing instrument.

16. The method of any of embodiments 1 to 15, wherein at least one of the one or more aqueous pigment-based inks is an aqueous cyan pigment-based ink that comprises one or more anionically-stabilized cyan pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %, based on the total weight of the aqueous cyan pigment-based ink.

17. The method of any of embodiments 1 to 16, wherein at least one of the one or more aqueous pigment-based inks is an aqueous magenta pigment-based ink that comprises one or more anionically-stabilized magenta pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %, based on the total weight of the aqueous magenta pigment-based ink.

18. The method of any of embodiments 1 to 19, wherein at least one of the one or more aqueous pigment-based inks is an aqueous yellow pigment-based ink that comprises one or more anionically-stabilized yellow pigment colorants, and the b) one or more water-miscible humectants consist essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 4 weight % and up to and including 8 weight %, based on the total weight of the aqueous yellow pigment-based ink.

19. The method of any of embodiments 1 to 18, wherein at least one of the one or more aqueous pigment-based inks is an aqueous black pigment-based ink that comprises one or more anionically-stabilized black pigment colorants, and the b) one or more water-miscible humectants consists essentially of 1,2-ethanediol, 1,2-propanediol, 1,3-propanediol, 1,2-butanediol, 1,3-butanediol, 2,3-butanediol, 1,2-pentanediol, 2,3-pentanediol, 1,3-pentanediol, 2-(2-hydroxyethoxy)ethanol, 2-[2-(2-hydroxyethoxy)ethoxy]ethanol, or a combination of two or more of these compounds, in a total amount of at least 5 weight % and up to and including 10 weight %, based on the total weight of the aqueous black pigment-based ink.

20. The method of any of embodiments 1 to 19, wherein each of the one or more aqueous pigment-based inks further comprises, independently, one or more of the c) acidic polymer.

21. The method of any of embodiments 1 to 20, wherein the one or more aqueous anionically-stabilized pigment-based inks comprises at least one aqueous cyan pigment-based ink, at least one aqueous magenta pigment-based ink, at least one aqueous yellow pigment-based ink, and at least one aqueous black pigment-based ink.

22. The method of any of embodiments 1 to 21, wherein the (a) one or more water-soluble salts of a multivalent metal cation comprises a cation that is magnesium (+2), calcium (+2), barium (+2), zinc (+2), or aluminum (+3).

23. The method of any of embodiments 1 to 22, wherein the weight ratio of the (a) one or more water-soluble salts of a multivalent metal cation to the (b) one or more of a polyvinyl alcohol and a polyvinyl amine, or to the copolymer derived from a vinyl alcohol and a vinyl amine, is from 0.02:1 to and including 100:1.

24. The method of any of embodiments 1 to 23, wherein both a polyvinyl alcohol and a polyvinyl amine are present in the aqueous-based ink-receptive layer, in weight ratio of polyvinyl alcohol to the polyvinyl amine is from 0.1:1 to and including 20:1, or the copolymer derived from a vinyl alcohol and a vinyl amine is present.

25. The method of any of embodiments 1 to 24, wherein the (c) crosslinking agent is present for crosslinking the polyvinyl alcohol, the polyvinyl amine, or both, or for crosslinking the copolymer derived from a vinyl alcohol and a vinyl amine.

26. The method of any of embodiments 1 to 25, wherein the (d) silica particles are present.

27. The method of any of embodiments 1 to 26, wherein the substrate is a water-impermeable substrate that is composed of a water-impermeable material.

28. The method of embodiment 27, wherein the ink receptive medium further comprises a first layer on at least one surface of the water-impermeable substrate, and the aqueous-based ink-receptive layer is disposed on the first layer.

29. The method of any of embodiments 1 to 28, further comprising applying an aqueous colorless ink composition to the image of one or more deposited aqueous pigment-based inks.

30. The method of any of embodiments 1 to 29, comprising depositing the one or more aqueous pigment-based inks in response to electrical signals.

31. The method of any of embodiments 1 to 30, wherein each of the one or more aqueous pigment-based inks is supplied from respective main fluid supplies as continuous streams, each of which continuous stream is broken into both printing drops and non-printing drops using a drop generator, and the method further comprising collecting and returning the non-printing drops from the respective continuous streams to the respective main fluid supplies, such that the non-printing drops are continuously recirculated between the respectively main fluid supply and the drop generator.

32. The method of any of embodiments 1 to 31, wherein the dry coverage of the aqueous-based ink-receptive layer on the substrate is at least 0.3 g/m² and up to and including 3 g/m².

33. The method of any of embodiments 1 to 32 that is carried out using a continuous inkjet printing system.

The following Examples are provided to illustrate the practice of this invention and are not meant to be limiting in any manner.

The suffix (C) designates control or comparative aqueous pigment-based inks, while the suffix (E) indicates inventive aqueous pigment-based inks.

Preparation of Aqueous Pigment-Based Inks

Polymeric Dispersant and Additive Preparation:
Polymeric Dispersant P-1

In a representative procedure, a 5-liter, three-necked, round bottom flask equipped with a mechanical stirrer, a reflux condenser, and a gas inlet was charged with 225 g of 1-methoxy-2-propanol and was sparged with nitrogen. Akzo-Nobel Chemicals, Inc., initiator PERKADOX® AMBN-GR (1.9 g) was added with stirring. A reactant reservoir was charged with 225 g of 1-methoxy-2-propanol, 23.4 g of 1-dodecanethiol, 203.5 g of benzyl methacrylate, 165.0 g of stearyl methacrylate, and 181.5 g of methacrylic acid, and the solution was degassed by nitrogen sparging. PERKADOX® AMBN-GR (7.7 g) was added and mixed in. The reactor temperature was raised to 77° C. and the reactants were pumped from the reservoir at a about 2.3 ml/min over a 360-minute period. The reaction mixture was then stirred for at least 12 hours at about 77° C. The resulting polymer was neutralized to completion with N,N-dimethylethanolamine and stirred for 45 minutes. The resulting reaction mixture was diluted with 2,580 g of water and filtered through a Pall Corp. UILTIPLEAT® polypropylene cartridge filter. The final polymer solution of Polymeric Dispersant P-1 had a concentration of about 20 weight % solids and its pH was 8.6. The resulting acidic polymer weight-average molecular weight ($M_w$) was 9,070 Daltons.

Polymeric Dispersant P-2

Polymeric dispersant P-2 was prepared in a similar fashion to P-1, except that 90% of the acid was reacted with potassium hydroxide during the neutralization step instead of with one equivalent of N,N-dimethylethanolamine. The final polymer solution of Polymeric Dispersant P-2 had a concentration of about 17 weight % solids.

Polymeric Additive P-3

A benzyl methacrylate-methacrylic acid copolymer having monomer weight ratio 77:23 and acid number of about 137, prepared using known methods, was 90%-neutralized with potassium hydroxide to provide an aqueous solution. The final polymer solution of Polymeric Additive P-3 had a concentration of about 25 weight % solids.

Polymeric Additive P-4

BASF Dispersions & Pigments North America JONCRYL® HPD 696, which is a styrene acrylic copolymer having a weight-average molecular weight ($M_w$) of 16,000 Daltons, was 90%-neutralized with potassium hydroxide to provide an aqueous solution. The final polymer solution of Polymeric Additive P-4 had a concentration of about 20 weight % solids.

Polymeric Additive P-5

In a 50-liter, round bottom flask equipped with thermometer, stirrer, water condenser, nitrogen inlet, and a vacuum outlet were placed 1,454.4 g of TERATHANE® 2000 polyether glycol, 670.5 g of 2,2-bis(hydroxymethyl) propionic acid, 313.2 g of 1,4-butanediol, and 3,771 g of ethyl acetate. The temperature was adjusted to 65° C., and when a homogeneous solution was obtained, 1,840.9 g of isophorone diisocyanate was added, followed by 184 g of ethyl acetate. The temperature was raised to 78° C. and maintained for 22 hours to complete the reaction. The reaction mixture was then diluted with 86 g of 2-propanol before being neutralized with 467.9 g of N,N-dimethylethanolamine. Under high shear, 18 kg of distilled water was added and the organic solvents were subsequently removed by distillation under vacuum. The resultant aqueous dispersion was filtered and was determined to have a non-volatile solids concentration of about 25 weight % and a pH value of about 8.0. The weight-average molecular weight ($M_w$) of the resulting polyurethane dispersion was found by size exclusion chromatography to be about 19,800.

Polymeric Additive P-6

JONCRYL® 586 acrylic resin (BASF) having $M_w$ of about 4,300 Daltons and acid number of about 110 was 100%-neutralized with N,N-dimethylaminoethanol to provide an aqueous solution. The final polymer solution of Polymeric Additive P-6 had a concentration of about 20 weight % solids.

Pigment Dispersion Preparations:
Pigment Dispersion KD-1 (Black Pigment Dispersion)

To a 2.5-gallon (9.46 liter), 9-inch (22.9 cm) diameter and 12-inch (30.5 cm) deep, double-walled stainless-steel mixing vessel containing four baffles were added water (1,000 g) and a solution of Polymeric Dispersant P-1 (1,000 g of a 19.9 weight % solution). A nominal 4-inch (10.2 cm), ring-style disperser impeller (Hockmeyer Equipment Corp. D-Blade) driven by a Charles Ross & Son Co. Model HSM-100LH-2 High Shear Mixer was centered 2 inches (5.1 cm) above the bottom of the mixing vessel and stirring was initiated. Cabot Corp. BLACK PEARLS® 900 carbon black pigment colorant (500 g) was slowly integrated into the fluid. Milling media comprising beads of polystyrene resin (a copolymer derived from styrene and a divinyl benzene/ethylvinyl benzene mixture) with an average particle diameter of 50 μm (3,000 g) was added slowly while increasing impeller speed. The mixture was milled with an impeller blade tip speed of about 19 m/sec for about 20 hours at an internal temperature of 25-35° C. Samples were periodically removed, diluted, and filtered for particle size determination by a Microtrac, Inc., NANOTRAC® NPA 150 dynamic light scattering particle size analyzer. When milling was complete, the dispersion/media milling mixture was further diluted with a solution of water (1,667 g) to a final pigment concentration of about 12 weight %, a polymeric dispersant concentration of about 4.8 weight % including the counterion, and a theoretical dispersion batch size of about 4,167 g. The impeller was removed, and the milling media was separated from the dispersion by filtration. A final filtration through a 0.3-μm removal efficiency Pall Corp. PROFILE II® depth filter gave roughly 4 kg of dispersion, approximately 80% yield. The volume-weighted $50^{th}$ percentile particle size was about 55 nm, and the $95^{th}$ percentile particle size was about 99 nm as characterized by the NANOTRAC® NPA 150 dynamic light scattering particle sizing instrument.

Pigment Dispersion MD-1 (Magenta Pigment Dispersion)

Magenta pigment dispersion MD-1 was prepared in a similar manner to Pigment Dispersion KD-1, except that BASF Dispersions & Pigments North America CINQUASIA® Magenta D 4500 J was used as pigment colorant in place of the carbon black pigment. The resulting dispersion had approximately 12 weight % of pigment colorant and 6.1 weight % of polymeric dispersant, including the counterion. The $50^{th}$ percentile particle size was about 16 nm and the $95^{th}$ percentile particle size was about 59 nm as characterized by the NANOTRAC® NPA 150 dynamic light scattering particle sizing instrument.

Pigment Dispersion CD-1 (Cyan Pigment Dispersion)

Cyan pigment dispersion CD-1 was prepared in a similar manner to Pigment Dispersion KD-1, except that Pigment Blue 15:4 and Pigment Green 7 were used as pigment colorants in a weight ratio of 3.75:1 in place of carbon black pigment colorant and Polymeric Dispersant P-2 was used in place of Polymeric Dispersant P-1 in the presence of Lubrizol Corp. SOLSPERSE® 12000 and Polymeric Additive P-3. The resulting dispersion had approximately 12 weight % of pigment colorant and 8.5 weight % polymer dispersant, including the counterion. The $50^{th}$ percentile particle size was about 28 nm, and the $95^{th}$ percentile particle size was about 86 nm as characterized by the NANOTRAC® NPA 150 dynamic light scattering particle sizing instrument.

Pigment Dispersion YD-1 (Yellow Pigment Dispersion)

To a 10-gallon (37.85 liter), 13-inch (33 cm) diameter and 17-inch (43.2 cm) deep, double-walled stainless-steel mixing vessel containing four baffles were added 2,560 g water and 2,400 g of a 15% solution of Polymeric Dispersant P-2. A nominal 6-inch (15.2 cm) ring-style disperser impeller (Hockmeyer Equipment Corp. D-Blade) driven by a Hockmeyer Model HBI-7.5-11-99 High Shear Mixer was centered 3 inches (7.6 cm) above the bottom of the mixing vessel and stirring was initiated. Sun Chemical Co. Pigment Yellow 74 (1,200 g) was slowly added as the pigment colorant to the fluid. Milling media comprising polymeric beads derived from styrene and a divinyl benzene/ethylvinyl benzene mixture with an average particle diameter of 50 μm (7,200 g) were added slowly while increasing impeller speed. The mixture was milled with an impeller blade tip speed of about 20 meters/second for about 20 hours at an internal temperature of 25-30° C. The dispersion/media mixture was further diluted with water (6,000 g) to a final pigment concentration of about 12 weight % and a Polymeric Additive P-2 concentration of about 4.1 weight %. The impeller was removed, and the dispersion was separated from the milling media by filtration. A final filtration through a 0.3 μm particle removal rating Pall Corp. PROFILE II® depth filter yielded roughly 10.6 kg of dispersion. The $50^{th}$ percentile particle size in the dispersion was about 11 nm, and the $95^{th}$ percentile particle size was about 16 nm as determined by a NANOTRAC® NPA 150 dynamic light scattering particle sizing instrument.

Preparation of Continuous Inkjet Ink Compositions:

Aqueous Black Pigment-Based Ink

Black aqueous pigment-based inks useful in CU inkjet printing processes, Inks K-A-K-D, were prepared using Pigment Dispersion KD-1 by combining the components at the relative proportions reported in the following TABLE I. In a representative procedure, 2.0 kg of each aqueous pigment-based ink was prepared by adding the components individually to a 2-liter high density polyethylene beaker using a 2-inch (5.1 cm) overhead impeller or a 1-inch (2.54 cm) magnetic stirrer bar rotating at about 500 rpm to provide good mixing. The ingredients (if so indicated) were added in the following functional component order: water, acid or acid solution, amine-acid salt solution, humectant and organic co-solvent, amine base, metal corrosion inhibitor, preservative or biocide, solvo-surfactant, soluble azo dye, pigment dispersion, surfactant, and antifoamant. Each aqueous pigment-based ink was mixed for about 2 minutes between ingredient additions, and then it was stirred for 1 hour after the final addition of the surfactant or antifoamant. Each aqueous pigment-based ink was filtered through a 1-inch (2.54 cm) Pall Corp. 0.45 μm effective pore size ULTIPOR® N66 cartridge filter at a rate of about 0.2-0.5 liter/min/inch of media. The resulting aqueous black pigment-based inks exhibited physical properties that are reported below in TABLE II.

TABLE I

| Functional Component | Component | Ink K-A (E) (weight %) | Ink K-B (E) (weight %) | Ink K-C (C) (weight %) | Ink K-D (C) (weight %) |
|---|---|---|---|---|---|
| Vehicle | Water | 52.8 | 52.8 | 52.8 | 42.4 |
| Pigment Dispersion | KD-1 | 33.8 | 33.8 | 33.8 | 33.8 |
| Amine Salt | Salt of N-methyl-diethanolamine and acetic acid (15 w/w % acetic acid) | 0.0 | 0.0 | 0.0 | 2.5 |
| Base | N-Methyl-diethanolamine | 0.0 | 0.0 | 0.0 | 0.74 |
| Binder Polymer Dispersion | P-5 | 6.0 | 6.0 | 6.0 | 7.2 |
| Binder Polymer Solution | P-6 | 0.0 | 0.0 | 0.0 | 4.5 |
| Humectant | 1,2-Propanediol | 7.0 | 0.0 | 0.0 | 0.0 |
| Humectant | 1,2-Ethanediol | 0.0 | 7.0 | 0.0 | 0.0 |
| Humectant | 1,2,3-Propanetriol | 0.0 | 0.0 | 7.0 | 8.5 |
| Metal Corrosion Inhibitor | COBRATEC® TT-50S (PMC Specialties Group, Inc.) | 0.10 | 0.10 | 0.10 | 0.10 |
| Preservative | PROXEL GXL® (Lonza, Inc.) | 0.10 | 0.10 | 0.10 | 0.10 |
| Surfactant | SURFYNOL® 440 (Evonik Corp.) | 0.18 | 0.18 | 0.18 | 0.18 |

TABLE II

| Properties | Ink K-A (E) | Ink K-B (E) | Ink K-C (C) | Ink K-D (C) |
|---|---|---|---|---|
| Particle Size 50$^{th}$ percentile (nm) | 56 | 56 | 56 | 51 |
| Particle Size 95$^{th}$ percentile (nm) | 98 | 99 | 102 | 84 |
| pH | 8.7 | 8.6 | 8.7 | 8.8 |
| Conductivity (mS/cm) | 1.31 | 1.40 | 1.39 | 4.2 |
| Density, 25° C. (g/cm³) | 1.028 | 1.032 | 1.040 | 1.048 |
| Dynamic Viscosity, at 25° C. in mPa-sec | 1.68 | 1.58 | 1.60 | 1.94 |
| Static Surface Tension, at 25° C. in mN/m | 39.3 | 39.6 | 39.6 | 38.3 |

Aqueous Cyan Pigment-Based Inks

Aqueous cyan pigment-based inks useful for CIJ inkjet printing processes, Inks C-A through C-C, were prepared from the pigment dispersion CD-1 by combining the components at the relative proportions shown below in TABLE III in a manner analogous to that described for the aqueous black pigment-based ink K-A. These aqueous cyan pigment-based inks exhibited physical properties that are reported below in TABLE IV.

TABLE III

| Functional Component | Ingredient | Ink C-A (E) (weight %) | Ink C-B (E) (weight %) | Ink C-C (C) (weight %) |
|---|---|---|---|---|
| Vehicle | Water | 74.4 | 72.4 | 72.3 |
| Pigment Dispersion | CD-I | 16.7 | 16.7 | 16.7 |
| Amine Salt | Salt of N-methyl-diethanolamine and acetic acid (15 w/w % acetic acid) | 0.0 | 0.0 | 1.8 |
| Base | N-Methyl-diethanolamine | 0.0 | 0.0 | 0.3 |
| Binder Polymer Dispersion | P-5 | 4.0 | 4.0 | 4.0 |
| Stabilizer Polymer | SOKALAN® K 17 P PVP Polymer (BASF) | 0.5 | 0.5 | 0.5 |
| Humectant | 1,2-Propanediol | 4.0 | 6.0 | 0.0 |
| Humectant | 1,2,3-Propanetriol | 0.0 | 0.0 | 4.0 |
| Metal Corrosion Inhibitor | COBRATEC® TT-50S (PMC Specialties Group, Inc.) | 0.1 | 0.1 | 0.1 |
| Preservative | PROXEL GXL® (Lonza, Inc.) | 0.1 | 0.1 | 0.1 |
| Surfactant | SURFYNOL® 440 (Evonik Corp.) | 0.1 | 0.1 | 0.1 |
| Antifoamant | SURFYNOL® DF-110L (Evonik Corp.) | 0.1 | 0.1 | 0.1 |

TABLE IV

| Properties | Ink C-A (E) | Ink C-B (E) | Ink C-C (C) |
|---|---|---|---|
| Particle Size 50$^{th}$ percentile (nm) | 33 | 33 | 31 |
| Particle Size 95$^{th}$ percentile (nm) | 90 | 90 | 70 |
| pH | 8.5 | 8.5 | 8.5 |
| Conductivity (mS/cm) | 1.92 | 1.86 | 4.69 |
| Density, 25° C. (g/cm³) | 1.016 | 1.018 | 1.024 |
| Dynamic Viscosity, at 25° C. in mPa-sec | 1.48 | 1.50 | 1.30 |
| Static Surface Tension, at 25° C. in mN/m | 37.8 | 37.8 | 37.1 |

Aqueous Magenta Pigment-Based Inks

Aqueous magenta pigment-based inks useful for CIJ inkjet printing processes, Inks M-A through M-H, were prepared from Pigment Dispersion MD-1 by combining the components at the relative proportions reported below in TABLE V in a manner analogous to that described for the aqueous black pigment-based ink K-A. These aqueous magenta pigment-based inks exhibited physical properties that are reported below in TABLE VI.

TABLE V

| Functional Component | Component | Ink M-A (E) (weight %) | Ink M-B (E) (weight %) | Ink M-C (E) (weight %) | Ink M-D (E) (weight %) |
|---|---|---|---|---|---|
| Vehicle | Water | 55.3 | 55.8 | 55.8 | 55.8 |
| Pigment Dispersion | MD-1 | 31.7 | 31.7 | 31.7 | 31.7 |
| Binder Polymer Dispersion | P-5 | 6.0 | 6.0 | 6.0 | 6.0 |
| Humectant | 1,2-Propanediol | 6.5 | 0.0 | 0.0 | 0.0 |
| Humectant | 1,2-Butanediol | 0.0 | 6.0 | 0.0 | 0.0 |
| Humectant | 1,3-Butanediol | 0.0 | 0.0 | 6.0 | 0.0 |
| Humectant | 2-(2-Hydroxyethoxy)ethanol | 0.0 | 0.0 | 0.0 | 6.0 |
| Humectant | 2-[2-(2-Hydroxyethoxy)ethoxy]ethanol | 0.0 | 0.0 | 0.0 | 0.0 |
| Humectant | 1,2,3-Propanetriol | 0.0 | 0.0 | 0.0 | 0.0 |
| Metal Corrosion Inhibitor | COBRATEC® TT-50S (PMC Specialties Group, Inc.) | 0.1 | 0.1 | 0.1 | 0.1 |
| Preservative | PROXEL GXL® (Lonza, Inc.) | 0.1 | 0.1 | 0.1 | 0.1 |
| Surfactant | SURFYNOL® 440 (Evonik Corp.) | 0.22 | 0.22 | 0.22 | 0.22 |
| Antifoamant | SURFYNOL® DF-110L (Evonik Corp.) | 0.10 | 0.10 | 0.10 | 0.10 |

| Functional Component | Component | Ink M-E (E) (weight %) | Ink M-F (E) (weight %) | Ink M-G (E) (weight %) | Ink M-H (C) (weight %) |
|---|---|---|---|---|---|
| Vehicle | Water | 55.8 | 55.0 | 55.8 | 55.3 |
| Pigment Dispersion | MD-1 | 31.7 | 31.7 | 31.7 | 31.7 |
| Binder Polymer Dispersion | P-5 | 6.0 | 6.0 | 6.0 | 6.0 |
| Humectant | 1,2-Propanediol | 0.0 | 0.0 | 3.0 | 0.0 |
| Humectant | 1,2-Butanediol | 0.0 | 6.0 | 0.0 | 0.0 |
| Humectant | 1,3-Butanediol | 0.0 | 0.0 | 0.0 | 0.0 |
| Humectant | 2-(2-Hydroxyethoxy)ethanol | 0.0 | 0.0 | 0.0 | 0.0 |
| Humectant | 2-[2-(2-Hydroxyethoxy)ethoxy]ethanol | 6.0 | 0.8 | 3.0 | 0.0 |
| Humectant | 1,2,3-Propanetriol | 0.0 | 0.0 | 0.0 | 6.5 |
| Metal Corrosion Inhibitor | COBRATEC® TT-50S (PMC Specialties Group, Inc.) | 0.1 | 0.1 | 0.1 | 0.1 |
| Preservative | PROXEL GXL® (Lonza, Inc.) | 0.1 | 0.1 | 0.1 | 0.1 |
| Surfactant | SURFYNOL® 440 (Evonik Corp.) | 0.22 | 0.22 | 0.22 | 0.22 |
| Antifoamant | SURFYNOL® DF-110L (Evonik Corp.) | 0.10 | 0.10 | 0.10 | 0.10 |

TABLE VI

| Properties | Ink M-A (E) | Ink M-B (E) | Ink M-C (E) | Ink M-D (E) |
|---|---|---|---|---|
| Particle Size $50^{th}$ percentile (nm) | 14 | 14 | 14 | 15 |
| Particle Size $95^{th}$ percentile (nm) | 60 | 60 | 60 | 57 |
| pH | 8.6 | 8.5 | 8.7 | 8.6 |
| Conductivity (mS/cm) | 1.47 | 1.61 | 1.53 | 1.60 |
| Density, 25° C. (g/cm³) | 1.023 | 1.021 | 1.018 | 1.026 |
| Dynamic Viscosity, at 25° C. in mPa-sec | 1.77 | 1.75 | 1.76 | 1.63 |
| Static Surface Tension, at 25° C. in mN/m | 40.7 | — | — | 40.7 |

| Properties | Ink M-A (E) | Ink M-B (E) | Ink M-C (E) | Ink M-D (E) |
|---|---|---|---|---|
| Particle Size $50^{th}$ percentile (nm) | 14 | 14 | 14 | 19 |
| Particle Size $95^{th}$ percentile (nm) | 60 | 60 | 60 | 59 |
| pH | 8.6 | 8.8 | 8.6 | 8.4 |
| Conductivity (mS/cm) | 1.60 | 1.57 | 1.55 | 1.60 |
| Density, 25° C. (g/cm³) | 1.027 | 1.023 | 1.024 | 1.033 |
| Dynamic Viscosity, at 25° C. in mPa-sec | 1.64 | 1.75 | 1.72 | 1.71 |
| Static Surface Tension, at 25° C. in mN/m | — | 37.5 | 39.0 | 38.8 |

Aqueous Yellow Pigment-Based Inks

Aqueous yellow pigment-based inks useful for CIJ inkjet printing processes, Inks Y-A (E) through Y-H (E), were prepared from Pigment Dispersion YD-1 by combining the components at the relative proportions reported below in TABLE VII in a manner analogous to that described for the aqueous pigment-based ink K-A. These aqueous pigment-based inks exhibited physical properties that are reported below in TABLE VIII.

TABLE VII

| Functional Component | Component | Ink Y-A (E) (weight %) | Ink Y-B (E) (weight %) | Ink Y-C (E) (weight %) | Ink Y-D (E) (weight %) |
|---|---|---|---|---|---|
| Vehicle | Water | 62.1 | 61.1 | 61.1 | 61.1 |
| Pigment Dispersion | YD-1 | 25.0 | 25.0 | 25.0 | 25.0 |
| Binder Polymer Solution | P-4 | 3.3 | 3.3 | 3.3 | 3.3 |
| Binder Polymer Solution | P-5 | 4.0 | 4.0 | 4.0 | 4.0 |
| Humectant | 2-[2-(2-Hydroxyethoxy)ethoxy]-ethanol | 5.0 | 0.0 | 0.0 | 0.0 |
| Humectant | 1,2-Propanediol | 0.0 | 6.0 | 0.0 | 0.0 |
| Humectant | 1,2-Butanediol | 0.0 | 0.0 | 6.0 | 0.0 |
| Humectant | 1,2-Pentanediol | 0.0 | 0.0 | 0.0 | 6.0 |
| Humectant | 1,5-Pentanediol | 0.0 | 0.0 | 0.0 | 0.0 |
| Humectant | 1,2,3-Propanetriol | 0.0 | 0.0 | 0.0 | 0.0 |
| Metal Corrosion Inhibitor | COBRATEC ® TT-50S (PMC Specialties Group, Inc.) | 0.1 | 0.1 | 0.1 | 0.1 |
| Preservative | PROXEL GLX ® (Lonza, Inc.) | 0.18 | 0.18 | 0.18 | 0.18 |
| Preservative | KORDEK MLX ® (DuPont, LLC) | 0.05 | 0.05 | 0.05 | 0.05 |
| Surfactant | SURFYNOL ® 440 (Evonik Corp.) | 0.20 | 0.20 | 0.20 | 0.20 |
| Antifoamant | SURFYNOL ® DF-110L (Evonik Corp.) | 0.08 | 0.08 | 0.08 | 0.08 |
| Vehicle | Water | 61.1 | 62.1 | 62.1 | 62.1 |
| Pigment Dispersion | YD-1 | 25.0 | 25.0 | 25.0 | 25.0 |
| Binder Polymer Solution | P-4 | 3.3 | 3.3 | 3.3 | 3.3 |
| Binder Polymer Solution | P-5 | 4.0 | 4.0 | 4.0 | 4.0 |
| Humectant | 2-[2-(2-Hydroxyethoxy)ethoxy]-ethanol | 0.0 | 0.0 | 1.0 | 1.0 |
| Humectant | 1,2-Propanediol | 0.0 | 0.0 | 5.0 | 0.0 |
| Humectant | 1,2-Butanediol | 0.0 | 0.0 | 0.0 | 5.0 |
| Humectant | 1,2-Pentanediol | 0.0 | 0.0 | 0.0 | 0.0 |
| Humectant | 1,5-Pentanediol | 6.0 | 0.0 | 0.0 | 0.0 |
| Humectant | 1,2,3-Propanetriol | 0.0 | 5.0 | 0.0 | 0.0 |
| Metal Corrosion Inhibitor | COBRATEC ® TT-50S (PMC Specialties Group, Inc.) | 0.1 | 0.1 | 0.1 | 0.1 |
| Preservative | PROXEL GLX ® (Lonza, Inc.) | 0.18 | 0.18 | 0.18 | 0.18 |
| Preservative | KORDEK MLX ® (DuPont, LLC) | 0.05 | 0.05 | 0.05 | 0.05 |
| Surfactant | SURFYNOL ® 440 (Evonik Corp.) | 0.20 | 0.20 | 0.20 | 0.20 |
| Antifoamant | SURFYNOL ® DF-110L (Evonik Corp.) | 0.08 | 0.08 | 0.08 | 0.08 |

TABLE VIII

| Properties | Ink Y-A (E) | Ink Y-B (E) | Ink Y-C (E) | Ink Y-D (E) |
|---|---|---|---|---|
| Particle Size 50$^{th}$ percentile (nm) | 14 | 11 | 11 | 11 |
| Particle Size 95$^{th}$ percentile (nm) | 29 | 16 | 17 | 18 |
| pH | 8.4 | 8.5 | 8.5 | 8.4 |
| Conductivity (mS/cm) | 2.07 | 2.24 | 2.23 | 2.23 |
| Density, 25° C. (g/cm$^3$) | 1.021 | 1.018 | 1.017 | 1.015 |
| Dynamic Viscosity, at 25° C. in mPa-sec | 1.58 | 1.54 | 1.59 | 1.62 |
| Static Surface Tension, at 25° C. in mN/m | 36.7 | 37.1 | 36.5 | 33.0 |
| Particle Size 50$^{th}$ percentile (nm) | 11 | 12 | 11 | 11 |
| Particle Size 95$^{th}$ percentile (nm) | 17 | 21 | 17 | 19 |
| pH | 8.3 | 8.4 | 8.4 | 8.3 |
| Conductivity (mS/cm) | 2.27 | 2.37 | 2.27 | 2.24 |
| Density, 25° C. (g/cm$^3$) | 1.014 | 1.025 | 1.019 | 1.018 |
| Dynamic Viscosity, at 25° C. in mPa-sec | 1.61 | 1.46 | 1.54 | 1.58 |
| Static Surface Tension, at 25° C. in mN/m | 37.1 | 34.3 | 37.2 | 36.6 |

Preparation and Formation of Aqueous Based Ink Receptive Layer:

Application of Aqueous Compositions:

Commercially available, non-primed, impermeable polymer film substrates were obtained from several suppliers, such as (1) Jindal Films' BICOR™ uncoated transparent 120 SLP, a 30-μm clear biaxially oriented polypropylene film (BOPP) designed for flexible packaging applications; (2) Jindal Films' BICOR™ uncoated transparent LPX-2, a 18-μm, 1-side heat-sealable biaxially oriented polypropylene film (BOPP); (3) BOPA, a clear biaxially-oriented polyamide film; (4) SM 100 T BOPET, a transparent biaxially oriented polyethylene terephthalate (BOPET) film from SML Films; (5) TRANSPET™ CT1-F from Transcendia, an uncoated transparent 12-μm polyester film that is corona treated on one side (BOPET). An aqueous-based ink-receptive layer was formed on each of these films. Aqueous compositions used to do this were prepared from the component types and the ingredient ranges described below in TABLE IX. Prior to the coating station, each film substrate was treated with a corona discharge device when required for acceptable wetting at a treatment energy density applied to the bare film surface of 30-80 W-min/m$^2$. The substantially similar aqueous compositions were applied to the film substrates using a roll-fed RK PrintCoat Instruments Ltd. Rotary Koater typically by a reverse gravure coating process that delivered 5.5 g/m$^2$ wet laydown of aqueous composition. The single station gravure desirably used a 60-degree hex engraving, 250 liter/inch, 14.8 BCM cylinder (100 liter/cm, 23.0 cc/m$^2$). The coating transfer efficiency could be varied by changing the ratio of coating roller to web speed ratio; higher speed ratios gave lower wet coverages. Speed ratios varied from ~1.0 to 1.8. The coated substrates were dried in-line using hot air dryers that produced a web temperature of at least about 40° C., resulting in a dry layer coverage range of 0.45-0.75 g/m$^2$.

Each of the resulting ink-receptive media was then either inkjet printed in-line with a full-width CIJ imprinter, or each was spooled on cores for later sheet-fed printing using 1-inch (2.54 cm) printhead on a benchtop apparatus employing pressurized containers for ink delivery, or a full-width CIJ printhead supplied with pump-pressurized recirculating ink using a fluid (main supply) station. The preferred ink-receptive medium coverage depended upon the intended aqueous pigment-based ink laydown, and roughly 3.0-4.0 g/m$^2$ wet coverage was targeted for monochrome printing, whereas 4.0-5.5 g/m$^2$ wet coverage was used for multicolor, high ink coverage printing.

TABLE IX

| Functional Component | CAS Registry Number | Representative Source | Typical Lower Level (weight %) | Typical Higher Level (weight %) |
|---|---|---|---|---|
| Vehicle | 7732-18-5 | Water | 92 | 86< |
| Polymer | 9002-89-5 | SELVOL ™ E 325 (Sekisui SCA, LLC) | 3.1 | 8.0 |
| Polymer | 183815-54-5 | LUPAMIN ® 9095 (BASF) | 3.8 | 8.6 |
| Polymer Crosslinking Resin | Not Available | POLYCUP ™ 9700 (Solenis) | 0.4 | 0.7 |
| Salt | 7791-18-6 | Commodity MgCl$_2$•6H$_2$O | 3.3 | 4.1 |
| Filler | 7631-86-9 | LUDOX ® CL (W. R. Grace & Co.) | 3.3 | 5.3 |
| Wax | Not Available | MICROSPERSION ® 150-50 (Micro Powders, Inc.) | 0.6 | 0.6 |
| Metal Corrosion Inhibitor | 95-14-7 | WINTROL ® B-FG (Wincom Inc.) | 0.1 | 0.1 |
| Metal Corrosion Inhibitor | 6381-92-6 | Commodity EDTA, Na$_2$ | 0.02 | 0.02 |
| Preservative | 2682-20-4 | KORDEK MLX ® (DuPont) | 0.0 | 0.1 |
| Surfactant | 66455-14-9 | CARBOWET ® 106 (Evonik Corp.) | 0.1 | 0.2 |
| Antifoamant | 125-86-3 | SURFYNOL ® 104PA (Evonik Corp.) | 0.2 | 0.5 |
| Antifoamant | Not Available | SURFYNOL ® AD01 (Evonik Corp.) | 0.1 | 0.1 |

TABLE X

| Coating Solution Composition Properties | Typical Lower Component Level Solution | Typical Higher Component Level Solution |
|---|---|---|
| Dry Solids (weight %) | 9.5 | 14.5 |
| pH | 6-9 | 6.5-8 |
| Density, 25° C. (g/cm$^3$) | 1.04 | 1.04 |
| Dynamic Viscosity, at Ambient Temperature in mPa-sec (Brookfield Viscometer using 32-second Zahn No. 4 Cup Time) | 40-50 | 160-200 |
| Static Surface Tension, at 25° C. in mN/m | 29 | 30 |

Sheet-Fed Printing of Aqueous Pigment-Based Inks:

In a representative procedure, the inlet ink fluid line tube of a small-scale continuous inkjet (CIJ) printing test fixture was inserted into a 2-liter bottle of inventive aqueous black pigment-based ink K-A (E) in the interior of a steel pressure vessel, and the system was sealed and pressurized to 60 psid (0.41 MPa) with compressed air. The ink fluid line was copiously flushed with aqueous black pigment-based ink to ensure that the new ink was not contaminated by the prior ink in the apparatus. The fixture consisted of the following elements: (1) a pressure vessel fluid system capable of pressurizing the aqueous black pigment-based ink in excess of 60 psid (0.41 MPa) thereby producing ink volumetric flow rates through a typical 600-nozzle/inch (236 nozzle/cm) MEMS silicon nozzle plate of about 63 ml/min/inch (24.8 ml/min/cm) of printhead nozzle plate; (2) a fluid manifold delivering pressurized ink to a miniaturized version of a KODAK PROSPER® Press Jetting Module drop generator to form printing and non-printing drops of aqueous black pigment-based ink using a 1-inch (2.54 cm) nozzle plate; (3) a drop selection system consisting of (a) a gutter to catch non-printing drops when the printer is not printing an image file or when it is not printing a given pixel even if it is printing an image file; (b) a non-printing drop deflection apparatus creating a deflection zone intersecting the drop curtain provided by positive and negative air duct assemblies to direct those drops to the gutter, and (c) a catch pan connected to a waste fluid line to remove the unprinted ink, (4) a vacuum drum capable of supporting a sheet of porous media (for example, uncoated free sheet paper) or non-porous media (for example, coated or uncoated polymer film) and spinning it continuously at precise speeds synchronized with a control unit to simulate web transport of the printing substrate in roll form; and (5) a print controller that (a) controls the printing drum speed and synchronizes the drum location in accord with the data feed to the miniature jetting module drop generator and also (b) transmits electrical signals to the jetting module CMOS circuitry that renders a raster processed image into pixel by pixel ink stream stimulation instructions using nozzle plate heater pulse patterns by optimized waveforms to generate non-printing catch drops and printing drops of ink delivered at the precise printing substrate surface pixel locations, as required.

The printing apparatus drum was loaded with a single sheet of ink receiving medium having an aqueous-based ink receptive layer on a film substrate that was affixed by its back side to a sheet of paper for convenience in handling and it was printed at 100% coverage full-width for about 5 inches (12.7 cm) in length forming a bar pattern at maximum ink laydown. The printed sheet was removed and allowed to air dry at ambient temperature and humidity, or it was incubated at 60° C. in a laboratory oven for a fixed period of time before testing and further processing.

Roll-Fed Printing of Aqueous Pigment-Based Inks:

In a representative procedure, the ink reservoir of a roll-fed continuous inkjet printing test stand fixture was charged with inventive aqueous black pigment-based ink K-A (E). Repetitive cycles of draining, flushing, and filling the ink reservoir and fluid lines with Ink K-A (E) were carried out to ensure that the new composition was not contaminated by a prior ink in the apparatus. The roll-fed printing test fixture was connected in-line, downstream from an RK PrintCoat Instruments Ltd. Rotary Koater forward gravure coating applicator allowing the roll-fed, uncoated flexible transparent film substrate to first be pre-coated with an aqueous composition to form an aqueous-based ink-receptive layer as described previously, to be at least partially dried, and then to be inkjet printed using one or more in-line KODAK PROSPER® S10 Imprinting Systems employing a full-width (4.25-inch (10.8 cm)) Stream™ 600 nozzle per inch (236 nozzle per cm) continuous inkjet printhead module enabling either 600×600 dot per inch (236×236 dots per cm) addressability, or 600×900 dpi (236×354 dpcm). The imprinting system consisted of the following elements: (1) a fluid system station capable of (a) pressurizing the aqueous black pigment-based ink in excess of 60 psid (0.41 MPa) thereby producing ink volumetric flow rates of up to about 2 liters/min; (b) delivering pressurized aqueous black pigment-based ink to a continuous inkjet printhead drop generator module; (c) returning unprinted ink under vacuum to the fluid system ink reservoir; (d) detecting the reservoir ink concentration by electrical resistivity measurement and replenishing the aqueous black pigment-based ink with replenisher fluid if concentrated by water evaporation, and adding more aqueous black pigment-based ink K-A (E) to the ink reservoir instead if it was depleted by use in printing and was at the correct colorant concentration; (e) providing the printhead with Printhead Cleaning and Storage Fluid to flush the nozzles and duct systems in order to restore accurate printing after fouling by dried ink build-up, and to shut down the system for safe storage over significant time durations; (2) a roll transport system with an encoder to detect and precisely regulate the transport speed of the substrate and synchronize a control unit to initiate and terminate image printing; (3) a continuous inkjet printhead PIC box assembly including (a) a KODAK PROSPER® Press Jetting Module with a MEMS silicon-based drop generator to form printing and non-printing drops of aqueous black pigment-based ink and a Coanda gutter to catch non-printing drops when the printer is not printing an image file or when it is not printing a given pixel even if it is printing an image file; (b) a non-printing drop deflection apparatus creating a deflection zone intersecting the drop curtain provided by positive and negative air duct assemblies to direct the non-printing drops to the Coanda gutter, and (c) an ink return line to the fluid system ink reservoir, and (4) a print controller that (a) synchronizes the web spatial location in accord with the data feed to the jetting module and also (b) transmits electrical signals to the jetting module CMOS circuitry that renders a raster processed image into pixel by pixel ink stream stimulation instructions using nozzle plate heater pulse patterns by optimized waveforms to generate non-printing catch drops and printing drops of aqueous black pigment-based ink delivered at the printing substrate surface pixel locations, as required.

The fluid system used a Micropump Inc. MICRO-PUIMP® series GJ-N23DB380A gear pump to deliver the ink through a Pall Corp. Disposable Filter Assembly capsule filter, DFA4201ZU0045, containing 0.45 µm nominal effective pore size ULTIPOR® GF-HV glass fiber media at about 65 psid (0.45 MPa) pressure drop at the nozzle plate, which generated a uniform drop velocity of about 20 m/sec. The fluid system gear pump speed setting was continually adjusted to provide and maintain constant fluid pressure at the jetting module to uniformly produce the desired drop velocity as per the system specification. The required system parameter settings for proper jetting and accurate aqueous black pigment-based ink replenishment were determined and recorded to a computer file termed an "inkdex" to enable printing on other systems, such as a web press fitted two-up with production KODAK PROSPER® S10 Imprinting Systems. The deflected non-printing ink drops were caught on a Coanda gutter and returned to the fluid system ink tank under vacuum. Sustained operation of the printer in catch mode of the non-printing drops resulted in gradual evaporation of the aqueous ink solvent vehicle. Aqueous black pigment-based ink concentration was maintained to within about 5% of the original aqueous black pigment-based ink concentration by addition of the particle-free Replenisher Fluid to it, if the latter became more than about 5% concentrated based on an ink electrical resistivity determination. Test targets were raster image processed to produce digital printing signal instructions for each pixel location at the appropriate transport speed of the test substrate at 600×600 pixels per inch (ppi) (236×236 pixels per centimeter (ppcm)) addressability for speeds up to about 1,000 feet per minute (303 meters per minute). Various test images were printed at different substrate transport speeds that profiled system functional printing speed capability using a 600-nozzles per inch (236 nozzles per cm) PROSPER® Press Jetting Module in a production print-head assembly configuration, which produced a 4.25-inch (10.8 cm) jet curtain print swath. Operational stability and start-up robustness ("runnability") of aqueous pigment-based ink K-A (E) were also noted on this and related test equipment. In order to investigate lamination bond strength of printed articles, it was useful to print side-by-side 1-inch (2.54 cm) bar targets separated by several inches (or respective cm) among other images. The resulting inkjet-printed articles were dried in-line using hot air dryers that produced a web temperature of at least about 50° C. and were wound up in roll form before chopping out segments in sheet form for further testing and processing into flexible inkjet-printed articles.

Formation of Flexible Inkjet-Printed Articles:

A sample of an inkjet-printed article as described above was evaluated for image quality and image durability (for example, rub or tack testing) to qualify it for further testing. Another sample of the same inkjet-printed article was subjected to lamination to a flexible film by bonding a piece of 3M™ SCOTCH® Transparent Tape, Catalog No. 600 to the inkjet-printed article top surface as it was resting on a solid counter top, using 4-6 passes of firm pressure applied to the tape back side with an operator's finger. The tape was then manually peeled slowly away from the sample over 6-8 seconds duration. The tape was observed for any transfer of inkjet printed image to the tape (cohesive or adhesive failure), which was optionally quantified by reflection colorimetry. Alternatively, the lamination bond strength was quantified using an MTS SINTECH® 1/G Electromechanical Testing System suitable for uniaxial tensile force peel testing using a 25-Newton load cell and head, and operating with a delamination draw speed of 270 mm/min rate.

Another sample of the inkjet-printed article substrate was coated with Dow ADCOTE™ 577/CR 87-124 two part polyurethane solvent-based adhesive system to form a functional layer on the inkjet-printed image of the inkjet-printed article. The adhesive was prepared in ethyl acetate solvent at 45% solids and applied to the inkjet-printed image using a #4 wire wound coating rod on the day after inkjet printing following ambient aging on a benchtop overnight. The adhesive-coated inkjet-printed articles were dried for 5 minutes at 60° C. in a static or convection laboratory oven. It was then laminated within 2 hours of the oven drying to a coversheet of LD43 low density polyethylene film as a flexible polymeric film to form a flexible inkjet-printed article. To accomplish this, the coversheet was first mounted to a piece of poster board for ease of handling and subjected to corona discharge treatment at settings of 1.8 KW, 40% belt speed to improve the adhesive bonding before applying it to the inkjet-printed article. The two-component bonded assembly was then passed through a roller laminator apparatus with the rollers heated to 70° C. and the nip pressure set at 25 psid (1.7 bar), with the transport speed at 0.4 inch/sec (1 cm/sec), to complete the lamination and formation of a flexible inkjet-printed article. The cooled flexible inkjet-printed article was removed from any supporting board or paper stock employed to improve its handling properties. It was subjected to peel force testing to determine the lamination bond strength with an MTS SINTECH 1/G Electromechanical Testing System operating with a draw speed of 270 mm/min rate using a 25 N load cell.

Lamination Bond Strength Measurements of Flexible Inkjet-Printed Articles: Articles Printed with Aqueous Black Pigment-Based Inks BICOR™ 120 SLP (BOPP) and TRANSPET™ CT1-F (BOPET) polymer films were used as substrates and were pre-coated off-line with an aqueous composition typical of the lower component levels shown above in TABLE IX to provide an aqueous-based ink-receptive layer at about 0.5 dry g/m$^2$ coverage on the substrate. The resulting ink receiving media were sheeted, attached to a sheet of plain bond paper for ease of handling, and inkjet printed at 600×900 dpi (236×354 dpcm) addressability as described above. Inkjet-printed articles having BOPET as a substrate and 100% coverage side-by-side 1-inch (2.54 cm) width bars were laminated to SCOTCH® Transparent Film Tape 600 as a flexible polymeric film as described above and the resulting flexible inkjet printed articles were examined for peel resistance on the same day, the next day, and 4 days later using an MTS SINTECH® 1/G Electromechanical Testing System. The results were very similar and within the noise of the experimental procedures. TABLE XI below reports the 4-day aged data peel force required for flexible polymeric film removal in entries 1-4. Lamination screening test values of peel force that are lower than about 1 N/cm suggest that unacceptable bond failure in practical lamination applications are probable, and values above about 2 N/cm suggest that fully acceptable bonds will be produced. Examples of the invention flexible inkjet printed articles in entries 1-2 prepared using aqueous black pigment-based inks containing water-miscible humectants having only two hydroxyl groups and C:O atom ratios of at least 1.0 produced test bond strengths in excess of 2.0 N/cm. In contrast, flexible inkjet-printed articles prepared using a traditional humectant in the aqueous pigment-based inks having three hydroxyl groups and a C:O atom ratio of at least 1.0:1.0 as shown in entries 3-4 exhibited unacceptable bond strengths well below 1.0 N/cm.

Samples of inkjet-printed articles prepared from BOPP substrates were laminated using a coating of solvent-based polyurethane adhesive and the application of a polyethylene film coversheet as a flexible polymeric film according to the procedure described above. Entry 5 in TABLE XI shows that aqueous pigment-based ink K-A (E) containing a water-miscible humectant according to the present invention, having only two hydroxyl groups and a C:O atom ratio greater than 1.0:1.0 produced a good bond strength of 1.8 N/cm in the flexible inkjet-printed articles compared with the exceedingly low and unacceptable value of 0.2 N/cm exhibited by the comparative flexible inkjet-printed articles prepared using aqueous black pigment-based inks containing a common humectant having three hydroxyl groups and a C:O atom ratio of at least 1.0:1.0, that is aqueous pigment-based ink K-D (C), shown in entry 6.

TABLE XI

| Entry | Ink | Water-Miscible Humectant | C:O Atom Ratio | No. of Hydroxy Groups | Substrate | Adhesive | Flexible Polymeric Film | Peel Force (N/cm) |
|---|---|---|---|---|---|---|---|---|
| 1 | K-A (E) | 1,2-Propanediol | 1.5:1.0 | 2 | CT1-F BOPET | 600 Tape | 600 Tape | 2.4 |
| 2 | K-B (E) | 1,2-Ethanediol | 1.0:1.0 | 2 | | | | 2.3 |
| 3 | K-C (C) | 1,2,3-Propanetriol | 1.0:1.0 | 3 | | | | 0.6 |
| 4 | K-D (C) | 1,2,3-Propanetriol | 1.0:1.0 | 3 | | | | 0.4 |
| 5 | K-A (E) | 1,2-Propanediol | 1.5:1.0 | 2 | 120 SLP BOPP | Solvent-based | PE | 1.8 |
| 6 | K-D (C) | 1,2,3-Propanetriol | 1.0:1.0 | 3 | | | | 0.2 |

Sheet-Fed Articles Printed with Aqueous Cyan Pigment-Based Inks

BICOR™ 120 SLP (BOPP) and TRANSPET™ CT1-F (BOPET) polymeric films (as substrates) were pre-coated off-line with an aqueous composition typical of the higher component levels shown in above TABLE IX to produce an aqueous-based ink-receptive layer at about 0.5 dry g/m² coverage. The resulting ink receiving media were sheeted, attached to a sheet of plain bond paper for ease of handling, and inkjet printed at 600×900 dpi (236×354 dpcm) addressability as described previously to provide inkjet-printed articles having patches of 100% cyan pigment-based ink coverage suitable for subsequent lamination tests. Samples of these inkjet printed articles were laminated using a coating of solvent-based polyurethane adhesive and the application of a polyethylene film coversheet as a flexible polymeric film according to the procedure described earlier. Peel force strength data were determined and are reported below in TABLE XII.

Entries 1 and 3 (lower water-miscible humectant level) and 2 and 4 (higher water-miscible humectant level) show that aqueous cyan pigment-based inks C-A (E) and C-B (E) according to the present invention and containing a water-miscible humectant having only two hydroxyl groups and a C:O atom ratio greater than 1.0:1.0 produced acceptable lamination bond strengths ranging from 1.6 N/cm to 2.1 N/cm on the two substrate films bearing an aqueous-based ink-receptive layer of the higher component levels described above in TABLE IX.

TABLE XII

| Entry | Ink | Water-Miscible Humectant | C:O Atom Ratio | No. of Hydroxy Groups | Substrate | Adhesive | Flexible Polymeric Film | Peel Force (N/cm) |
|---|---|---|---|---|---|---|---|---|
| 1 | C-A (E) | 1,2-Propanediol | 1.5:1.0 | 2 | BOPET | Solvent-Based | PE | 2.0 |
| 2 | C-B (E) | 1,2-Propanediol | 1.5:1.0 | 2 | | | | 2.1 |
| 3 | C-A (E) | 1,2-Propanediol | 1.5:1.0 | 23 | 120 SLP BOPP | Solvent-based | PE | 1.8 |
| 4 | C-B (E) | 1,2-Propanediol | 1.5:1.0 | 2 | | | | 1.6 |

Sheet-Fed Articles Printed with Magenta Pigment-Based Inks

BICOR™ 120 SLP (BOPP) and TRANSPET™ CT1-F (BOPET) polymer films (as substrates) were pre-coated off-line with an aqueous composition typical of the higher component levels shown in TABLE IX to produce an aqueous-based ink-receptive layer at about 0.5 dry g/m² coverage. The resulting ink receiving media were sheeted, attached to a sheet of plain bond paper for ease of handling, and inkjet printed at 600×900 dpi (236×254 dpcm) addressability as described above. The resulting inkjet-printed articles having prints of 100% coverage side-by-side 1-inch (2.54 cm) width bars were laminated to SCOTCH® Transparent Film Tape 600 as a flexible polymeric film as described above to form flexible inkjet printed articles that were examined for peel resistance on the next day, and 4 days later using an MTS SINTECH® 1/G Electromechanical Testing System operating with a draw speed of 270 mm/min rate and using a 25 N load cell. TABLE XIII below reports the 4-day aged data peel force required for flexible polymeric film removal from the inkjet printed articles in entries 1-3. It was found that dihydroxy water-miscible humectants according to the invention having a C:O atom ratio of at least 1.0:1.0 provided much higher peel force strengths than a comparative flexible inkjet-printed article prepared using an aqueous pigment-based ink containing 1,2,3-trihydroxypropane (glycerol) as the only water-miscible humectant.

Samples of the same inkjet printed articles were also laminated using a coating of solvent-based polyurethane adhesive and the application of a polyethylene film as the flexible polymeric film to form flexible inkjet printed articles according to the procedure described above. According to the following TABLE XIII, entries 4-11, flexible inkjet-printed articles formed using BOPP film as a substrate (with an aqueous-based ink-receptive layer according to the invention) and inventive aqueous magenta pigment-based inks bonded to the flexible polymeric film using a solvent based polyurethane adhesive uniformly and exhibited improved peel force strength over a flexible inkjet printed article formed using the same substrate and aqueous-based ink-receptive layer using but having been inkjet printed using a "comparative" aqueous magenta pigment-based ink containing 1,2,3-trihydroxy propane (glycerol) as the only water-miscible humectant. Generally, the peel force required in these tests was two to threefold greater for the inventive flexible inkjet-printed articles versus the comparative flexible inkjet-printed article containing the ubiquitous glycerol used often in the art.

In the following TABLE XIII, entries 12-16, flexible inkjet-printed articles prepared using a printed BOPET substrate bearing an aqueous-based ink receptive layer and using aqueous magenta pigment-based inks according to the present invention also showed two to threefold increase in the required delamination peel force relative to flexible inkjet-printed articles prepared using a comparative aqueous pigment-based ink containing 1,2,3-trihydroxypropane (glycerol) as the water-miscible humectant.

TABLE XIII

| Entry | Ink | Water-miscible Humectant | C:O Atom Ratio | No. of Hydroxy Groups | Substrate | Adhesive | Flexible Polymeric Film | Peel Force (N/cm) |
|---|---|---|---|---|---|---|---|---|
| 1 | M-A (E) | 1,2-Propanediol | 1.5:1.0 | 2 | 120 SLP BOPP | 600 Tape | 600 Tape | 1.8 |
| 2 | M-D (E) | 2-(2-hydroxyethoxy)-ethanol | 1.3:1.0 | 2 | | | | 1.9 |
| 3 | M-H (C) | 1,2,3-Propanetriol | 1.0:1.0 | 3 | | | | 1.2 |
| 4 | M-A (E) | 1,2-Propanediol | 1.5:1.0 | 2 | 120 SLP BOPP | Solvent-Based | PE | 3.4 |
| 5 | M-B (E) | 1,2-Butanediol | 2.0:1.0 | 2 | | | | 4.0 |
| 6 | M-C (E) | 1,3-Butanediol | 2.0:1.0 | 2 | | | | 2.5 |
| 7 | M-D (E) | 2-(2-hydroxyethoxy)-ethanol | 1.3:1.0 | 2 | | | | 1.2 |
| 8 | M-E (E) | 2-[2-(2-Hydroxyethoxy)ethoxy]-ethanol | 1.5:1.0 | 2 | | | | 2.6 |
| 9 | M-F (E) | 1,2-butanediol + 2-[2-(2-Hydroxyethoxy)ethoxy]ethanol | 1.5-2.0 | 2 | | | | 2.4 |
| 10 | M-G (E) | 1,2-propanediol + 2-[2-(2-Hydroxyethoxy)ethoxy]ethanol | 1.5:1.0 | 2 | | | | 2.1 |
| 11 | M-H (C) | 1,2,3-Propanetriol | 1.0:1.0 | 3 | | | | 0.8 |
| 12 | M-A (E) | 1,2-Propanediol | 1.5:1.0 | 2 | BOPET | Solvent-Based | PE | 2.2 |
| 13 | M-B (E) | 1,2-Butanediol | 2.0:1.0 | 2 | | | | 1.9 |
| 14 | M-C (E) | 1,3-Butanediol | 2.0:1.0 | 2 | | | | 2.4 |
| 15 | M-F (E) | 1,2-butanediol + 2-[2-(2-Hydroxyethoxy)ethoxy]ethanol | 1.5-2.0 | 2 | | | | 2.6 |
| 16 | M-H (C) | 1,2,3-Propanetriol | 1.0:1.0 | 3 | | | | 0.6 |

Sheet-Fed Articles Printed with Aqueous Yellow Pigment-Based Inks

BICOR™ LPX-2 (BOPP), Clear OPA (BOPA), and Constantia Flexibles transparent polyethylene terephthalate (BOPET) polymeric films were used as substrates and pre-coated off-line with an aqueous composition typical of the higher component levels shown above in TABLE IX to produce an aqueous-based ink-receptive layer at about 0.6 dry g/m² coverage. The resulting ink receiving media were sheeted, attached to a sheet of plain bond paper for ease of handling, and inkjet printed at 600×900 dpi (236×354 dpcm) addressability as described above to provide patches of 100% yellow pigment-based ink in coverage suitable for subsequent lamination tests. The resulting inkjet-printed articles containing BOPP, OPA, and BOPET substrates of 100% coverage side-by-side, 1-inch (2.54 cm) width bars were laminated process by applying a coating of solvent-based polyurethane adhesive with a wire-wound coating rod and applying a polyethylene film as a flexible polymeric film using heated, pressurized bonding and a laminator in accordance with the procedure described above, to provide flexible inkjet-printed articles. After curing these flexible inkjet-printed articles for two days, the lamination bond strength was determined using a SINTECH® 1/G Electromechanical Testing System that is described above. The peel forces exhibited by the flexible inkjet-printed articles formed from inkjet-printed articles bonded to a polyethylene flexible polymeric film using a solvent based polyurethane adhesive and OPA film substrate are reported below in TABLE XIV (entries 1-8); those containing BOPP substrate are reported in entries 9-16; and those containing BOPET substrate are reported in entries 17-24.

All flexible inkjet-printed article samples derived according to the present invention, that is those inkjet printed using aqueous yellow pigment-based inks containing only dihydroxy water-miscible humectants having a C:O ratio of at least 1.0:1.0 exhibited improved lamination bond strength over the flexible inkjet-printed articles prepared using an aqueous pigment-based ink containing only a comparative trihydroxy water-miscible humectant (glycerol). For each flexible inkjet-printed article, one or more examples of the invention produced a two-fold or greater relative improvement in bond strength over the comparative flexible inkjet-printed article, that is a bond strength substantially greater than 1.0 N/cm, as high as 2.0 N/cm in numerous cases, and even 3.0 N/cm in one instance, assuring the formation of a robust and durable flexible inkjet-printed article. The comparative flexible inkjet-printed article never met or exceeded a minimum bond strength threshold of about 1.0 N/cm.

TABLE XIV

| Entry | Ink | Water-miscible Humectant | C:O Atom Ratio | No. of Hydroxy Groups | Substrate | Adhesive | Flexible Polymeric Film | Peel Force (N/cm) |
|---|---|---|---|---|---|---|---|---|
| 1 | Y-A (E) | 2-[2-(2-Hydroxyethoxy)ethoxy]-ethanol | 1.5:1.0 | 2 | OPA | Solvent-based | PE | 1.5 |
| 2 | Y-B (E) | 1,2-Propanediol | 1.5:1.0 | 2 | | | | 1.4 |
| 3 | Y-C (E) | 1,2-Butanediol | 2.0:1.0 | 2 | | | | 1.4 |
| 4 | Y-D (E) | 1,2-Pentanediol | 2.5:1.0 | 2 | | | | 1.5 |
| 5 | Y-E (E) | 1,5-Pentanediol | 2.5:1.0 | 2 | | | | 3.0 |
| 6 | Y-F (C) | 1,2,3-Propanetriol | 1.0:1.0 | 3 | | | | 0.8 |
| 7 | Y-G (E) | 1,2-propanediol + 2-[2-(2-Hydroxyethoxy)-ethoxy]-ethanol | 1.5:1.0 | 2 | | | | 2.6 |
| 8 | Y-H (E) | 1,2-butanediol + 2-[2-(2-Hydroxyethoxy)ethoxy]ethanol | 1.5-2.0 | 2 | | | | 2.2 |
| 9 | Y-A (E) | 2-[2-(2-Hydroxyethoxy)ethoxy]ethanol | 1.5:1.0 | 2 | LPX-2 BOPP | Solvent-based | PE | 0.5 |
| 10 | Y-B (E) | 1,2-Propanediol | 1.5:1.0 | 2 | | | | 2.3 |
| 11 | Y-C (E) | 1,2-Butanediol | 2.0:1.0 | 2 | | | | 1.90 |
| 12 | Y-D (E) | 1,2-Pentanediol | 2.5:1.0 | 2 | | | | 0.8 |
| 13 | Y-E (E) | 1,5-Pentanediol | 2.5:1.0 | 2 | | | | 1.9 |
| 14 | Y-F (C) | 1,2,3-Propanetriol | 1.0:1.0 | 3 | | | | 0.4 |
| 15 | Y-G (E) | 1,2-propanediol + 2-[2-(2-Hydroxyethoxy)-ethoxy]-ethanol | 1.5:1.0 | 2 | | | | 2.3 |
| 16 | Y-H (E) | 1,2-butanediol + 2-[2-(2-Hydroxyethoxy)ethoxy]ethanol | 1.5-2.0 | 2 | | | | 2.4 |
| 17 | Y-A (E) | 2-[2-(2-Hydroxyethoxy)ethoxy]-ethanol | 1.5:1.0 | 2 | BOPET | Solvent-based | PE | 0.8 |
| 18 | Y-B (E) | 1,2-Propanediol | 1.5:1.0 | 2 | | | | 1.6 |
| 19 | Y-C (E) | 1,2-Butanediol | 2.0:1.0 | 2 | | | | 1.3 |
| 20 | Y-D (E) | 1,2-Pentanediol | 2.5:1.0 | 2 | | | | 0.8 |
| 21 | Y-E (E) | 1,5-Pentanediol | 2.5:1.0 | 2 | | | | 2.2 |
| 22 | Y-F (C) | 1,2,3-Propanetriol | 1.0:1.0 | 3 | | | | 0.3 |
| 23 | Y-G (E) | 1,2-propanediol + 2-[2-(2-Hydroxyethoxy)-ethoxy]-ethanol | 1.5:1.0 | 2 | | | | 0.7 |
| 24 | Y-H (E) | 1,2-butanediol + 2-[2-(2-Hydroxyethoxy)ethoxy]ethanol | 1.5-2.0:1.0 | 2 | | | | 0.8 |

Roll-Fed Articles Printed with Aqueous Black and Magenta Pigment-Based Inks

In-line application of an ink receptive layer to a substrate followed by at least partial drying and inkjet printing with an aqueous pigment-based ink at 600×600 dpi (236×354 dpcm) addressability was carried out on TRANSPET™ CT1-F (BOPET) support using the Rotary Koater forward gravure coating applicator in tandem with two PROSPER® S-Series Imprinting Systems and dryers, following the general procedure described above. After coating, inkjet printing, and drying, the resulting roll of inkjet-printed article was unwound and chopped into sheets of inkjet-printed articles, each of which was attached to a sheet of plain bond paper for ease of handling. Flexible inkjet-printed articles were laminated using a coating of solvent-based polyurethane adhesive over the inkjet-printed image of each inkjet-printed article followed by the application of a polyethylene film coversheet as a flexible polymeric film with heated, pressurized bonding in accord with the procedure described above, to provide flexible inkjet-printed articles. After curing for at least two days, the lamination bond strength of each flexible inkjet-printed article was determined with a using a SINTECH® 1/G Electromechanical Testing System to peel each inkjet-printed article from the corresponding flexible polymeric film, and the bond strength results from use of selected aqueous pigment-based inks in individual experiments are reported in the following TABLE XV. In entry 1, inventive aqueous black pigment-based ink K-A containing only water-miscible humectant 1,2-propanediol having two hydroxy groups and a C:O atom ratio of 1.5:1.0 produced a flexible inkjet-printed article having a lamination bond strength of 2.1 N/cm. In entry 2, inventive aqueous magenta pigment-based ink M-B containing only water-miscible humectant 1,2-butanediol having 2 hydroxy groups and a C:O atom ratio of 2.0:1.0 produced a flexible inkjet-printed article having a lamination bond strength of 1.7 N/cm. Lamination bond strength values of peel force that are near or lower than about 1 N/cm forecast undesirable rates of bond failure in practical commercial applications, whereas values near or above about 2 N/cm suggest that an acceptably robust bond has been produced for a flexible film based label application, for example.

be of the type that includes separate drop charging and drop deflection electrodes or can be of the type that incorporates both functions in a single electrode. The present invention can also be employed in any of the drop-on-demand printing systems that are compatible with the aqueous pigment-based inks described herein.

The invention has been described in detail with particular reference to certain preferred embodiments thereof, but it will be understood that variations and modifications can be obtained within the spirit and scope of the invention.

PARTS LIST 10 ink-receptive medium
20 ink-receptive medium
30 inkjet-printed article
40 flexible inkjet-printed article
100 water-impermeable support
110 aqueous-based ink-receptive layer
200 water-impermeable support
210 first layer
215 water-impermeable substrate
220 aqueous-based ink-receptive layer
300 water-impermeable substrate
310 water-impermeable support
320 first layer
330 aqueous-based ink-receptive layer
340 inkjet-printed image
350 functional layer
400 water-impermeable substrate
410 water-impermeable support
420 first layer
430 aqueous-based ink-receptive layer
440 inkjet-printed image
450 functional layer
460 flexible polymeric film or paper

The invention claimed is:

1. A method for inkjet printing, comprising, in order:
   A') providing an ink receptive medium comprising a substrate and an aqueous-based ink-receptive layer disposed thereon, which aqueous-based ink-receptive layer has an outer surface, and comprises:

TABLE XV

| Entry | Ink | Water-miscible Humectant | C:O Atom Ratio | No. of Hydroxy Groups | Substrate | Adhesive | Flexible Polymeric Film | Peel Force (N/cm) |
|---|---|---|---|---|---|---|---|---|
| 1 | K-A (E) | 1,2-Propanediol | 1.5:1.0 | 2 | BOPET | Solvent-based | PE | 2.1 |
| 2 | M-B (E) | 1,2-Butanediol | 2.0:1.0 | 2 | | | | 1.7 |

It should be noted that a water-based tie-layer (layer 420 in FIG. 4) is not required to achieve the high peel forces observed for all of the foregoing examples of flexible inkjet-printed articles listed above in TABLES XI-XV, which comprise the aqueous-based ink-receptive layers derived from the formulations shown above in TABLE IX.

The present invention has been demonstrated above for use in a continuous ink jet printing system that employs a gas flow drop deflection mechanism, thermal drop stimulation devices, and nozzle plates fabricated out of silicon. However, the present invention can also be employed in continuous ink jet printing systems that use electrostatic drop deflection mechanisms, pressure modulation or vibrating body stimulation devices, and nozzles plates fabricated out of other types of materials. Electrostatic deflection can (a) one or more water-soluble salts of a multivalent metal cation in an amount of at least 0.6 weight % and up to and including 49 weight %;

(b) one or both of a polyvinyl alcohol and a polyvinyl amine, or a copolymer derived from a vinyl alcohol and a vinyl amine, in a total amount of at least 0.5 weight % and up to and including 30 weight %;

optionally, (c) a crosslinking agent in an amount of at least 0.01 weight % and up to and including 5 weight %; and optionally, (d) silica particles in an amount of up to and including 30 weight all amounts (a), (b), (c), and (d) being based on the total weight of the aqueous-based ink-receptive layer; and B) depositing directly onto the outer surface of the aqueous-based ink-receptive layer, one or more aqueous pigment-based inks to provide an image of one or more deposited anionically-stabilized pigment colorants, each aqueous pigment-based ink having at least 75 weight % and up to and including 95 weight % of water, and comprising:
a) one or more anionically-stabilized pigment colorants;
b) one or more water-miscible humectants that are present in a total amount of at least 1 weight % and up to and including 20 weight %, and consist essentially of compounds, each of which has a carbon atom to oxygen atom ratio of at least 1.0:1.0 and only two hydroxy groups; and
optionally,
c) an acidic polymer that is an anionic polyurethane, an acidic acrylic polymer, an acidic styrene-acrylic polymer, or any combination of these materials, each acidic polymer having an acid number of at least 50 and up to and including 240, and each acidic polymer being neutralized with sufficient base to render it dispersible or soluble in each aqueous pigment-based ink,
wherein the weight % amounts of water and of the b) water-miscible humectants are based on the total weight of each aqueous pigment-based ink.

2. The method of claim 1, further comprising:
D) forming a functional layer on the image of one or more deposited anionically-stabilized pigment colorants.

3. The method of claim 1, wherein the b) one or more water-miscible humectants consist essentially of compounds, each of which has a carbon atom to oxygen atom ratio of at least 1.0:1.0 and up to and including 2.7:1.0.

4. The method of claim 1, wherein the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, and a combination of two or more of these compounds.

5. The method of claim 1, wherein the b) one or more water-miscible humectants are present independently in each of the one or more aqueous pigment-based inks in a total amount of at least 3 weight % and up to and including 10 weight %, based on the total weight of each aqueous pigment-based inks.

6. The method of claim 1, wherein 50% of the volume of each of the a) one or more pigment colorants in each aqueous pigment-based ink is provided by pigment colorant particles having a diameter of less than 100 nm, and 95% of the volume of each of the a) one or more pigment colorants is provided by pigment colorant particles having a diameter of less than 150 nm, the particle size diameters being measured using a dynamic light scattering particle sizing instrument.

7. The method of claim 1, wherein at least one of the one or more aqueous pigment-based inks is an aqueous cyan pigment-based ink that comprises one or more anionically-stabilized cyan pigment colorants, and the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, and a combination of two or more of these compounds, in a total amount of at least 4 weight % and up to and including 8 weight %, based on the total weight of the aqueous cyan pigment-based ink.

8. The method of claim 1, wherein at least one of the one or more aqueous pigment-based inks is an aqueous magenta pigment-based ink that comprises one or more anionically-stabilized magenta pigment colorants, and the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, and a combination of two or more of these compounds, in a total amount of at least 4 weight % and up to and including 8 weight %, based on the total weight of the aqueous magenta pigment-based ink.

9. The method of claim 1, wherein at least one of the one or more aqueous pigment-based inks is an aqueous yellow pigment-based ink that comprises one or more anionically-stabilized yellow pigment colorants, and the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, and era combination of two or more of these compounds, in a total amount of at least 4 weight % and up to and including 8 weight %, based on the total weight of the aqueous yellow pigment-based ink.

10. The method of claim 1, wherein at least one of the one or more aqueous pigment-based inks is an aqueous black pigment-based ink that comprises one or more anionically-stabilized black pigment colorants, and the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, and a combination of two or more of these compounds, in a total amount of at least 5 weight % and up to and including 10 weight %, based on the total weight of the aqueous black pigment-based ink.

11. The method of claim 1, wherein the weight ratio of the (a) one or more water-soluble salts of a multivalent metal cation to the (b) one or more of a polyvinyl alcohol and a polyvinyl amine, or to the copolymer derived from a vinyl alcohol and a vinyl amine, is from 0.02:1 to and including 100:1.

12. The method of claim 1, wherein both a polyvinyl alcohol and a polyvinyl amine are present in the aqueous-based ink-receptive layer, in weight ratio of polyvinyl alcohol to the polyvinyl amine is from 0.1:1 to and including 20:1, or the copolymer derived from a vinyl alcohol and a vinyl amine is present.

13. The method of claim 1, wherein the substrate is a water-impermeable substrate that is composed of a water-impermeable material.

14. The method of claim 1, wherein each of the one or more aqueous pigment-based inks is supplied from respective main fluid supplies as respective continuous streams, wherein each of the respective continuous stream is broken into both printing drops and non-printing drops using a drop generator, and
the method further comprising collecting and returning the non-printing drops from the respective continuous streams to the respective main fluid supplies, such that the non-printing drops are continuously recirculated between the respective main fluid supply and the drop generator.

15. The method of claim 1, wherein the dry coverage of the aqueous-based ink-receptive layer on the substrate is at least 0.3 g/m² and up to and including 3 g/m².

16. The method of claim 1 that is carried out using a continuous inkjet printing system.

17. A method for inkjet printing, comprising, in order:
A) providing a substrate;
A') depositing an aqueous-based ink-receptive layer composition on an outer surface of the substrate to form an aqueous-based ink-receptive layer on the outer surface of the substrate, thereby forming an ink receptive medium, wherein the aqueous-based ink- receptive layer has an outer surface, and comprises:
  (a) one or more water-soluble salts of a multivalent metal cation in an amount of at least 0.6 weight % and up to and including 49 weight %;
  (b) one or more of a polyvinyl alcohol and a polyvinyl amine, or a copolymer derived from a vinyl alcohol and a vinyl amine, in a total amount of at least 0.5 weight % and up to and including 30 weight %;
  optionally, (c) a crosslinking agent in an amount of at least 0.01 weight % and up to and including 5 weight %; and
  optionally, (d) silica particles in an amount of up to and including 30 weight %,
  all amounts (a), (b), (c), and (d) being based on the total weight of the aqueous-based ink-receptive layer;
B) depositing directly on the outer surface of the aqueous-based ink-receptive layer, one or more aqueous pigment-based inks to provide an image of one or more deposited anionically-stabilized pigment colorants,
  each aqueous pigment-based ink having at least 75 weight % and up to and including 95 weight % of water, and comprising:
  a) one or more anionically-stabilized pigment colorants;
  b) one or more water-miscible humectants in a total amount of at least 1 weight % and up to and including 20 weight %, and consisting essentially of compounds, each of which has a carbon atom to oxygen atom ratio of at least 1.0:1.0 and only two hydroxy groups; and
  optionally,
  c) an acidic polymer that is an anionic polyurethane, an acidic acrylic polymer, an acidic styrene-acrylic polymer, or any combination of these materials, each acidic polymer having an acid number of at least 50 and up to and including 240, and each acidic polymer being neutralized with sufficient bases to render it dispersible or soluble in each aqueous anionically-stabilized pigment-based ink,
  wherein the weight % amounts of water and the b) water-miscible humectants are based on the total weight of each aqueous pigment-based ink;
  and optionally,
D) forming a functional layer on the one or more deposited anionically-stabilized pigment colorants.

18. The method of claim 17, further comprising between steps A) and A'):
surface treating the substrate to increase its surface energy to at least 45 dyne/cm.

19. A method for inkjet printing, comprising, in order:
A') providing an ink receptive medium comprising a water-impermeable substrate and an aqueous-based ink-receptive layer disposed thereon, which aqueous-based ink-receptive layer has an outer surface, and comprises:
  (a) one or more water-soluble salts of a multivalent metal cation in an amount of at least 1 weight % and up to and including 24 weight %;
  (b) one or both of a polyvinyl alcohol and a polyvinyl amine, or a copolymer derived from a vinyl alcohol and a vinyl amine, in a total amount of at least 1 weight % and up to and including 20 weight %;
  (c) a crosslinking agent in an amount of at least 0.1 weight % and up to and including 2 weight %; and
  (d) silica particles in an amount of up to and including 10 weight %,
  all amounts (a), (b), (c), and (d) being based on the total weight of the aqueous-based ink-receptive layer; and
B) depositing directly onto the outer surface of the aqueous-based ink-receptive layer, two or more aqueous pigment-based inks, defined as follows, to provide an inkjet-printed image comprising two or more deposited anionically-stabilized pigment colorants,
  each of the two or more aqueous pigment-based inks comprising:
  a) one or more anionically-stabilized pigment colorants defined as follows, wherein 50% of the volume of each the a) one or more anionically-stabilized pigment colorants is provided by pigment colorant particles having a diameter of less than 100 nm, and 95% of the volume of each of the a) one or more anionically-stabilized pigment colorants is provided by pigment colorant particles having a diameter of less than 150 nm, the particle size diameters being measured using a dynamic light scattering particle sizing instrument ;
  b) one or more water-miscible humectants defined as follows; and
  c) an acidic polymer that is an anionic polyurethane, an acidic acrylic polymer, an acidic styrene-acrylic polymer, or any combination of these materials, each acidic polymer having an acid number of at least 50 and up to and including 240, each acidic polymer being neutralized with sufficient base to render it dispersible or soluble in each aqueous pigment-based ink,
  wherein the two or more aqueous pigment-based inks are selected from the following:
  an aqueous cyan pigment-based ink that comprises one or more anionically-stabilized cyan pigment colorants, and the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-2-hydroxyethoxy)ethoxy]ethanol, and a combination of two or more of these compounds, in a total amount of at least 4 weight % and up to and including 8 weight %;
  an aqueous magenta pigment-based ink that comprises one or more anionically-stabilized magenta pigment colorants, and the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, and a combination of two or more of these compounds, in a total amount of at least 4 weight % and up to and including 8 weight %;

an aqueous yellow pigment-based ink that comprises one or more anionically-stabilized yellow pigment colorants, and the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, and a combination of two or more of these compounds, in a total amount of at least 4 weight % and up to and including 8 weight %; and an aqueous black pigment-based ink that comprises one or more anionically-stabilized black pigment colorants, and the b) one or more water-miscible humectants are selected from the group consisting of 1,2-ethanediol, 1,2-propanediol, 1,3-propanediol, 1,2-butanediol, 1,3-butanediol, 2,3-butanediol, 1,2-pentanediol, 2.3-pentanediol, 1,3-pentanediol, 2-(2-hydroxyethoxy)ethanol, 2-[2-(2-hydroxyethoxy)ethoxy]ethanol, and a combination of two or more of these compounds, in a total amount of at least 5 weight % and up to and including 10 weight %, all amounts being based on the total weight of the respective aqueous pigment-based ink.

* * * * *

UNITED STATES PATENT AND TRADEMARK OFFICE
CERTIFICATE OF CORRECTION

| | |
|---|---|
| PATENT NO. | : 11,155,076 B2 |
| APPLICATION NO. | : 16/551890 |
| DATED | : October 26, 2021 |
| INVENTOR(S) | : Lussier et al. |

It is certified that error appears in the above-identified patent and that said Letters Patent is hereby corrected as shown below:

In the Specification

In Column 44, TABLE VI-continued: delete the table heading:

"
| Properties | Ink M-A (E) | Ink M-B (E) | Ink M-C (E) | Ink M-D (E) |
|---|---|---|---|---|

"

And insert correct table heading:

| Properties | Ink M-E (E) | Ink M-F (E) | Ink M-G (E) | Ink M-H (C) |
|---|---|---|---|---|

In Column 45, Line 3, delete:
"printing processes, Inks Y-A (E) through Y-H (E), were"

And insert:
-- printing processes, Inks Y-A through Y-H, were --

In Column 45, TABLE VII, after row 14 (beginning with "Surfactant" and ending with "0.20"), insert new column header:

| Functional Component | Component | Ink Y-E (E) (weight %) | Ink Y-F (C) (weight %) | Ink Y-G (E) (weight %) | Ink Y-H (E) (weight %) |
|---|---|---|---|---|---|

¶ --

Signed and Sealed this
Twenty-sixth Day of April, 2022

Katherine Kelly Vidal
*Director of the United States Patent and Trademark Office*

CERTIFICATE OF CORRECTION (continued)
U.S. Pat. No. 11,155,076 B2

In Column 47, TABLE VIII, after row 7 (beginning with "Static Surface Tension, at 25° C. in mN/m" and ending with "33.0"), insert new column header:

| Properties | Ink Y-E (E) | Ink Y-F (C) | Ink Y-G (E) | Ink Y-H (E) |
|---|---|---|---|---|

--  --